(12) United States Patent
Mandeville-Clarke et al.

(10) Patent No.: US 9,715,233 B1
(45) Date of Patent: Jul. 25, 2017

(54) SYSTEM AND METHOD FOR INPUTTING A SECOND TAXI-START LOCATION PARAMETER FOR AN AUTONOMOUS VEHICLE TO NAVIGATE TO WHILST REDUCING DISTRACTION

(71) Applicants: Ben Mandeville-Clarke, Tinbeerwah (AU); Danum Anthony Harris-Lusk, Tewantin (AU)

(72) Inventors: Ben Mandeville-Clarke, Tinbeerwah (AU); Danum Anthony Harris-Lusk, Tewantin (AU)

( * ) Notice: Subject to any disclaimer, the term of this patent is extended or adjusted under 35 U.S.C. 154(b) by 0 days.

(21) Appl. No.: 15/361,484

(22) Filed: Nov. 27, 2016

(30) Foreign Application Priority Data

Nov. 9, 2016  (AU) .................................. 2016904562

(51) Int. Cl.
  *G05D 1/02* (2006.01)
  *H04L 29/08* (2006.01)
  (Continued)

(52) U.S. Cl.
  CPC ........... *G05D 1/0278* (2013.01); *B60K 35/00* (2013.01); *G01C 21/362* (2013.01); *G01C 21/3667* (2013.01); *G05D 1/0022* (2013.01); *G05D 1/0212* (2013.01); *G05D 1/0221* (2013.01); *G05D 1/0259* (2013.01); *G06F 3/04847* (2013.01); *G06F 3/04883* (2013.01); *G06F 3/167* (2013.01); *H04L 67/20* (2013.01); *B60K 2350/104* (2013.01); *B60K 2350/1028* (2013.01); *B60K 2350/1044* (2013.01);
  (Continued)

(58) Field of Classification Search
  CPC .. G06Q 20/145; G06K 9/00624; G08G 1/017; G08G 1/00; G05D 1/00; G05D 1/10; G05D 1/02; G05D 1/0278; H04L 67/20; G06F 3/04883; G06F 3/167
  See application file for complete search history.

(56) References Cited

U.S. PATENT DOCUMENTS 9,465,388 B1 * 10/2016 Fairfield .............. G05D 1/0044
2014/0136414 A1 * 5/2014 Abhyanker ............ G06Q 50/28
705/44

(Continued)

*Primary Examiner* — Behrang Badii

(57) ABSTRACT

A system and method for enabling a user of a mobile communications device to select or input a second taxi-start location parameter for a substantially autonomous vehicle to navigate to within a pre-determined period of time and wherein the successful registering and processing of the second taxi-start location parameter overrides a previously user-inputted first taxi-start location parameter. The system and method includes executing a first set of programmatic instructions wherein the user can, via a coupled user-interface device, select or input a second taxi-start location parameter, and wherein the user-supplied input comprises a second taxi-start location parameter for a substantially autonomous vehicle to navigate to that is separated by a distance from a previously user-inputted first taxi-start location parameter, and wherein the distance separation is between and inclusive of 12 meters and 4502 meters. The first set of programmatic instructions is further operable to register and process the second taxi-start location parameter generated between 6 seconds and 5581.2 seconds after the generation and processing of the first taxi-start location parameter.

13 Claims, 30 Drawing Sheets

(51) Int. Cl.
    *G06F 3/0484*     (2013.01)
    *G06F 3/0488*     (2013.01)
    *G06F 3/16*     (2006.01)
    *B60K 35/00*     (2006.01)
    *G01C 21/36*     (2006.01)
    *G05D 1/00*     (2006.01)
    *G06Q 50/30*     (2012.01)
    *G05D 1/10*     (2006.01)
    *G06Q 20/14*     (2012.01)
    *G08G 1/017*     (2006.01)
    *G06K 9/00*     (2006.01)
    *G01C 23/00*     (2006.01)

(52) U.S. Cl.
    CPC ............... *G01C 23/00* (2013.01); *G05D 1/00* (2013.01); *G05D 1/10* (2013.01); *G06K 9/00624* (2013.01); *G06Q 20/145* (2013.01); *G06Q 50/30* (2013.01); *G08G 1/017* (2013.01)

(56) References Cited

U.S. PATENT DOCUMENTS

2015/0153175 A1*   6/2015   Skaaksrud ............ H04W 12/06
                                                                                              701/23
2016/0078759 A1*   3/2016   Nerayoff .............. G06Q 20/145
                                                                                              701/3

* cited by examiner

SYSTEM AND METHOD FOR INPUTTING A SECOND TAXI-START LOCATION PARAMETER FOR AN AUTONOMOUS VEHICLE TO NAVIGATE TO WHILST REDUCING DISTRACTION

REFERENCES CITED—U.S. PATENT DOCUMENTS

U.S. Pat. No. 5,122,957 A June 1992 Hattori
U.S. Pat. No. 5,414,625 A May 1995 Hattori
U.S. Pat. No. 5,548,516 A August 1996 Gudat et al.
U.S. Pat. No. 5,961,559 A October 1999 Shimbara et al.
U.S. Pat. No. 6,119,057 A September 2000 Kawagoe
U.S. Pat. No. 8,352,112 B2 January 2013 Mudalige

FIELD OF THE DISCLOSURE

The embodiments of the present disclosure relates to autonomous vehicles, and more specifically to novel control and communications technologies for one or more autonomous vehicles.

BACKGROUND

A conventional request for a ride-sharing service typically originates from a mobile communications device adapted to communicate with a cellular or other wireless communications network. The request originating from the mobile communications device typically comprises data indicating the current geographical position of the mobile communications device via utilization of common geographical positioning systems, such as GPS satellites. Alternatively, the request originating from the mobile communications device may comprise a user-inputted "taxi-start location" that the vehicle dispatched to service the user via ride-sharing will arrive at within a pre-determined period of time in order to collect the user lodging the request via the mobile communications device and hence officially commence the ride-sharing service and/or one or more associated users. Occasionally, the user lodging the request via mobile communications device for the ride-sharing service may decide to change the user-inputted "taxi-start location" parameter to be a non-matching "taxi-start location" parameter. As autonomous vehicles and substantially autonomous vehicles are significantly integrated into society's transport infrastructure, users of mobile communications devices may opt to own an autonomous vehicle or substantially autonomous vehicle asset for commercial or recreational usage. Such users may wish to submit a first request to their substantially autonomous vehicle asset to collect the user at a first taxi-start location parameter. Prior to the substantially autonomous vehicle navigating to within a pre-determined distance of the user's requesting mobile communications device, the user may wish to submit a second request to their substantially autonomous vehicle asset to collect the user at a second taxi-start location parameter substantially non-matching with the first taxi-start location parameter. In an alternative scenario, a user of a substantially autonomous vehicle ride-sharing platform may submit a first request for a substantially autonomous vehicle to collect the user at a first taxi-start location parameter. Prior to the substantially autonomous vehicle navigating to within a pre-determined distance of the user's requesting mobile communications device, the user may wish to submit a second request for a substantially autonomous vehicle to collect the user at a second taxi-start location parameter substantially non-matching with the first taxi-start location parameter. A previously unconsidered aspect in the art is ensuring that there is substantial non-distraction by a social media network to the user specifically when a user of a mobile communications device wishes to submit a change in the "taxi-start location" parameter to be non-matching with a prior lodged "taxi-start location" parameter and prior to the substantially autonomous vehicle navigating to within a pre-determined distance of the requesting mobile communications device.

SUMMARY OF THE DISCLOSURE

A problem realized by Applicants with usage of substantially autonomous vehicles for, specifically, transport or ride-sharing services for human users, non-human users, or goods and services, is the occurrence of user-distraction during the changing of a taxi-start location from a first location to a second, distance-separated taxi-start location, for a particular transport journey enabled by a substantially autonomous vehicle, due to the interference of social media networks on the user-interface device utilized to change the taxi-start location for the substantially autonomous vehicle to navigate to from the first taxi-start location to the second taxi-start location. The occurrence of user-distraction due to the activities of a social media network may limit the user from achieving desired travel preferences and outcomes. Minimizing user-distraction due to a social media network, at least during a period of time in which the user is changing the service-start location from the first taxi-start location to the second taxi-start location, is desired in order to assist in maximising user engagement with the programmatic instructions executed to facilitate the service-start location from the first taxi-start location to the second taxi-start location.

According to a preferred embodiment, a first set of processor readable programmatic instructions executed by a processor listens and registers user-supplied input via a user-interface device, wherein the user-supplied input comprises a second taxi-start location parameter for a substantially autonomous vehicle to navigate to that is separated by a distance from a previously user-inputted first taxi-start location parameter, and wherein the distance separation is between and inclusive of 12 meters and 4502 meters. The first set of processor readable programmatic instructions is operable to register and process the second taxi-start location parameter generated between 6 seconds and 5581.2 seconds after the generation and processing of the first taxi-start location parameter. Simultaneous to the registering and processing of the second taxi-start location parameter, a second set of processor readable programmatic instructions may be executed by the processor, wherein the second set of processor readable programmatic instructions includes maintaining a secure communications link with a third party server and retrieving from the third party server an assigned number of news items, information links, active links, and wherein the assigned order of news items is limited to a restricted number of users. The second set of processor readable programmatic instructions may not generate and send data to the user-interface device simultaneous to the registering and processing of the second taxi-start location parameter by the first set of processor readable programmatic instructions. The processing of the second taxi-start location parameter further includes generating a data packet comprising the user-inputted second taxi-start location parameter, converting the data packet into a first modulated electromagnetic signal and a second modulated electromagnetic signal and transmitting the data packet via the first modulated electromagnetic signal and the second modulated electromagnetic signal to a receiving antenna of a substantially autonomous vehicle operable to register and process the request, or a dedicated processing centre comprising an intermediate aspect between the mobile communications device and an appropriate substantially autonomous vehicle. The first set of processor readable programmatic instructions is further operable to listen for a confirmation data packet generated and transmitted from the intermediate aspect and/or an appropriate substantially autonomous vehicle and, upon registering the confirmation data packet, to generate an output signal via the user-interface device with a user-perceptible confirmation that the second taxi-start location parameter has overridden the first taxi-start location parameter.

According to one or more alternative embodiments, the process steps of the preferred embodiment may be rearranged or substituted or, in appropriate instances, removed entirely, without affecting the spirit and scope of the present disclosure.

According to one or more alternative embodiments, process steps may be added in. For example, including the step of determining that the current electrical energy available capacity of a portable energy source coupled to the mobile communications device is at least 15 percent of the total charge holding capacity of the portable energy source. In a further example, a step may be added in wherein at an instance in time after the registration and processing of the second taxi-start location parameter, the second set of processor readable programmatic instructions is operable to generate output signals at the user-interface device comprising an assigned order of news items.

According to some aspects of the present disclosure, the second set of processor readable programmatic instructions is operable to generate output signals simultaneous or substantially simultaneous to the generation of output signals by the first set of processor readable programmatic instructions wherein the output signals generated by the processor readable second set of processor readable programmatic instructions occupies no more than seven and a quarter eighths of the total user-interactive area of an electronics display comprising an aspect of the user-interface device and a minimum of a twentieth of a first eighth of the user-interactive area of the electronics display. If the limited output signals generated by the second set of processor readable programmatic instructions are audio, such audio output signals are extant, in sum, for preferably no more than 27 seconds, and less preferably up to a maximum of 5572.2 seconds. It may be necessary, in one or more instances, for the user to access one or more aspects of a social media network substantially simultaneous to the registering and processing of the second taxi-start location parameter.

According to aspects of the present disclosure, the second taxi-start location parameter may be stored in a memory unit coupled to the processor.

According to aspects of the present disclosure, user-input comprising the second taxi-start location parameter includes one or more user-inputs of an image-based or motion-image based geolocational positional marker, a text-string of characters, a plurality of audio signals convertible into a plurality of electrical signals, a motion signal detectable by a motion sensor and convertible into at least one electrical signal.

According to aspects of the present disclosure, the second taxi-start location parameter comprises one or more of a physical address, a road name, a commercial building name and/or address, a residential building name and/or address, a latitude, a longitude, a GPS coordinate, a readable map coordinate, a name of a person, or a landmark name.

Further features of the preferred and alternative embodiments and other aspects of the present disclosure as well as the structure and operation of various embodiments are described in detail below with reference to the accompanying drawings.

BRIEF DESCRIPTION OF THE DRAWINGS

To assist in understanding the preferred embodiments, alternative embodiments, and various aspects of the present disclosure, and to enable a person skilled in the art to put one or more aspects of this disclosure into practical effect, preferred embodiments, alternative embodiments, and various aspects of the present disclosure will be described by way of example only with reference to the accompanying drawings, in which:

FIG. 1 shows an exemplary embodiment flow diagram of a process method of the present disclosure for replacing a first taxi-start location parameter with a second taxi-start location parameter for a substantially autonomous vehicle to navigate to;

DETAILED DESCRIPTION OF THE DISCLOSURE

Figure 1:
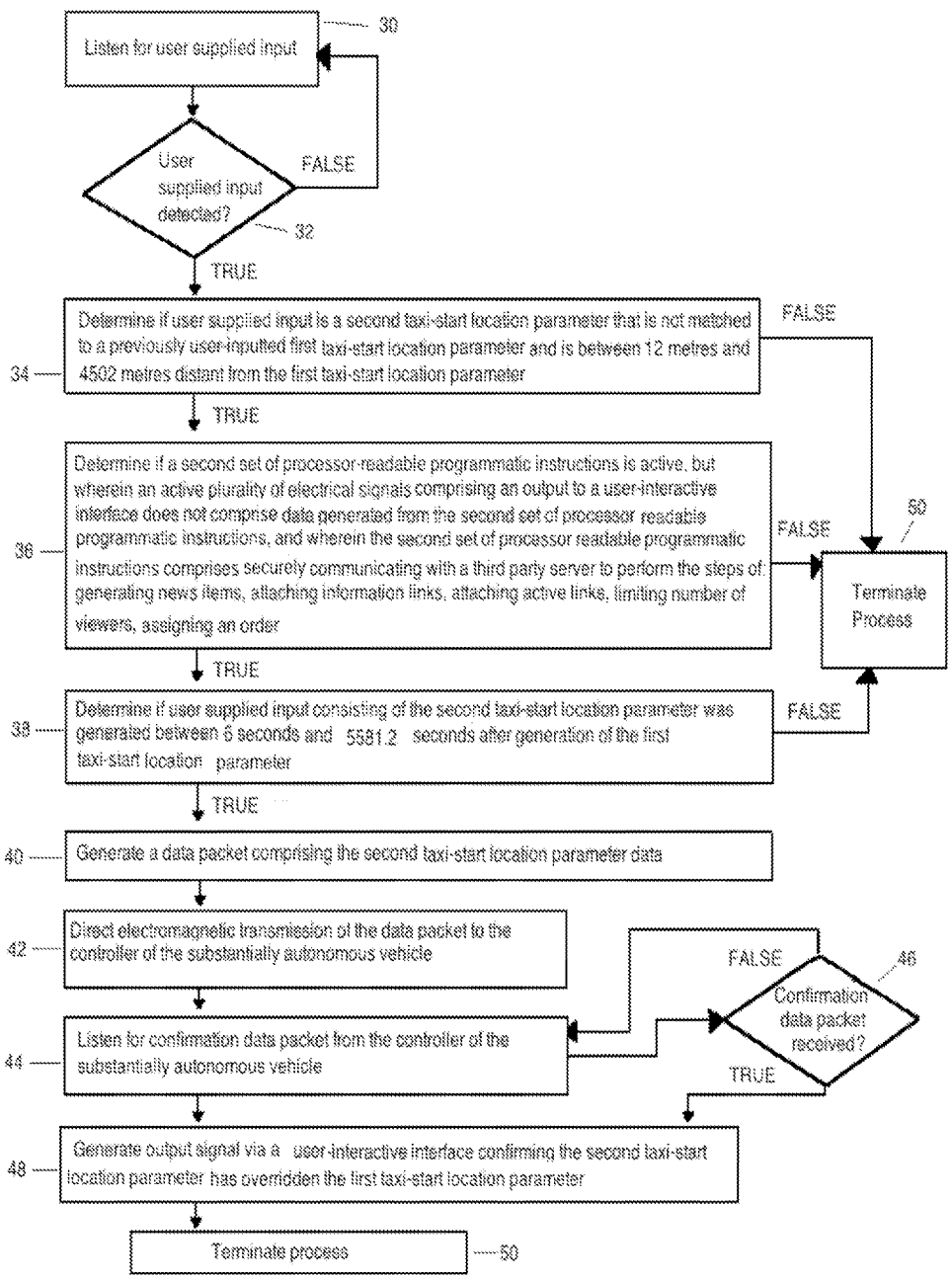

The embodiments of the present disclosure will now be described in reference to preferred and alternative embodiments of systems, apparatuses and methods that enable and facilitate selecting or inputting a second taxi-start location parameter for a substantially autonomous vehicle to navigate to, and wherein the second taxi-start location parameter overrides and is non-matching with a first taxi-start location parameter. Specifically, examples will be described which illustrate particular features of the preferred and alternative embodiments of the present disclosure. The embodiments of the present disclosure, however, are not limited to any particular features nor, limited by the examples described herein. Therefore, the descriptions of the embodiments that follow are for the purposes of illustration and not limitation.

In the present disclosure, an autonomous vehicle, an autonomous vehicle taxi-service, or a substantially autonomous vehicle, or a substantially autonomous vehicle taxi-service refers to a substantially self-driving car, truck, bus, motorcycle, boat or other vehicle that allows for the ferrying or transport of a single or plurality of human and/or non-human occupants, including commercial goods, products and services, or some combination thereof, from a first geographical location to at least a second geographical location over an arbitrary or pre-determined time frame, time, or time-window. The terms autonomous vehicle and substantially autonomous vehicle are readily interchangeable. An autonomous vehicle refers to Level 3, Level 4, or Level 5 classification of autonomous vehicle as defined by the SAE International Standard J3016, with an emphasis on Level 4 and Level 5 autonomous vehicles, wherein Level 5 autonomous vehicles or substantially autonomous vehicles refers to a class of autonomous vehicle that does not require human intervention to operate. Hence, the autonomous vehicle may be partially or fully independent of active human intervention.

In the present disclosure, an autonomous vehicle taxi-service or a substantially autonomous vehicle taxi-service may also be defined, where appropriate, as an autonomous vehicle ride-sharing service for human, non-human occupants, commercial goods, products and services, or some combination thereof, or a substantially autonomous vehicle ride-sharing service for human, non-human occupants, commercial goods, products and services, or some combination thereof.

In the present disclosure, a user input/output device may comprise, and is interchangeable with, a mobile communications device, such as a smartphone, Blackberry, mobile phone, and the like, a smart-watch, a smart device, a paging device, a PDA, a "wearable" device, an "Internet of Things" device, a two way radio, a notebook computer, a tablet, phablet, a plurality of networked communications devices, a virtual reality device, an augmented reality device, a holographic device, or any derivative thereof, or an electronics device capable of connecting to a wireless communications network or a telecommunications network. Each of these devices may be classified as a computer.

In the present disclosure, all applicable software programs and modules are stored as computer or processor-readable programming instructions, programmatic instructions, or code on one or more non-transient processor-readable storage mediums. Processor-readable media includes both computer storage media and communications media including any medium that facilitates the transfer of a software program or module from one place to another. A storage media may be any available media that can be accessed by a processor. By way of example, and not limitation, such processor-readable media can comprise RAM, ROM, EEPROM, CD-ROM, solid-state drive, USB-compatible device, or other optical disk storage, magnetic disk storage, or other magnetic storage devices, or any other medium that can be used to carry or store desired program code in the form of instructions or data structures that can be accessed by mobile communication device, substantially autonomous vehicle, or other user input/output device controllers. Also, any connection is properly termed a processor-readable medium. For example, if the software is transmitted from a website, server, or other remote source using a coaxial cable, fiber optic cable, twisted pair, digital subscriber line (DSL), or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of processor-readable media. Cloud or remote based storage systems are also to be considered within the scope of processor-readable media. Those with skill in the art will readily recognize additional processor-readable storage mediums that fall within the scope of the present disclosure.

In the present disclosure, all programmatic computer instructions comprising software modules and software programs are preferably executed by one or more appropriate processors, as necessary, on the mobile communications device, or other user input/output device, and on the substantially autonomous vehicle. The processor may comprise one or more processors, controllers, microcontrollers, microprocessors, digital signal processors, analogue processors, field programmable gate array processors, and the like. Those with skill in the art will readily recognize additional processors that fall within the scope of the present disclosure.

In the present disclosure, a controller is considered interchangeable with or equivalent to a processor.

In the present disclosure, one or more sets of processor readable programmatic instructions may be implemented in one or more appropriate and relevant software and/or hardware combinations, including electrical circuitry.

In the present disclosure, the first set of processor readable programmatic instructions comprises one or more of the process methods presented herein, but may additionally comprise distinct process methods executed by the same processor or processors as the application requires. Such distinct process methods may optionally include displaying to the user the current battery level, or sending a plurality of output signals to the user-interactive interface not associated with the registering and processing of the second taxi-start location parameter. The first set of processor readable programmatic instructions is operable to enable a user of the mobile communications device to select or user-input a second taxi-start location parameter in accordance with one or more preferred or alternative embodiments, or other aspects of the present disclosure.

In the present disclosure, the second set of processor readable programmatic instructions is operable to maintain a secure communications link with a third party server that is a social network provider, and retrieve from the third party server an assigned number of news items, information links, active links, and wherein the assigned order of news items is limited to a restricted number of users. The second set of processor readable programmatic instructions may not generate and send data to the user-interface device simultaneous to the registering and processing of the second taxi-start location parameter by the first set of processor readable programmatic instructions, except in accordance with one or more limitations described with reference to one or more embodiments of the present disclosure.

In the present disclosure, a taxi-start location parameter refers to the geographical location pinpointed, selected or inputted by a user of a mobile communications device for a substantially autonomous vehicle to navigate to in order to effectively collect the user and/or other users of the substantially autonomous vehicle's taxi-service and begin a transport journey of a pre-determined length of time to at least one pre-determined destination location parameter. The taxi-start location parameter may comprise one or more of map or GPS coordinates, latitude and/or longitude coordinates, processor-readable reference numbers and/or characters, a street address, a building identifying number, a postcode, a name of a person, or any other relevant and appropriate geographical location identifying characteristic.

FIG. 1 shows an exemplary embodiment flow diagram of a process method of the present disclosure for replacing a first taxi-start location parameter with a second taxi-start location parameter for a substantially autonomous vehicle to navigate to in order to collect the user or associates of the user of the mobile communications device used to facilitate the exemplary process method. This exemplary embodiment has the advantage of ensuring that the user is non-distracted by a social media network during the time-frame required to modify the taxi-start location parameter from the first taxi-start location parameter to the second taxi-start location parameter. This exemplary embodiment process method is executed by a first set of processor readable programmatic instructions or programming code preferably stored in a memory unit associated with the mobile communications device and accessible by the processor of the mobile communications device—i.e. integrated in the mobile communications device's protective housing, or via an accessible and preferably secure cloud service, wherein the cloud service is stored on one or more servers located external to the mobile communications device and accessible via an appropriate internet or world wide web protocol or protocols, or some combination thereof. In a step 30 the first set of processor readable programmatic instructions is operable to listen for user-supplied input. User supplied input may be facilitated by one or more user-interactive interface devices (i.e. user-interface device) operable to generate one or more specific electric signals in direct response to user-supplied input. Example user-interactive interfaces are detailed further in this specification, however, non-limiting examples include a touch screen, a 3D light display occupying a pre-determined area of free-space, a natural language converter, a voice to text converter, a keyboard, an infrared sensor, a motion sensor, an electrical input sensor, a clicking device, a set of programmatic instructions, some combination thereof, and the like. Those with skill in the art will readily recognize available and appropriate derivatives and alternatives. In this step 30, the user-supplied input is directly related to replacement of a first taxi-start location parameter for a substantially autonomous vehicle previously determined and selected or inputted by the user with a second, substantially non-matching taxi-start location parameter. In a step 32, the process method determines the presence of user-input. Said user-input is directly related with the input of a second taxi-start location parameter to override a previously user-inputted first taxi-start location parameter. If, at the step 32, the determination of the user-input returns FALSE, the process method returns or iterates back to the step 30. The checking of TRUE or FALSE may necessarily occur once or a plurality of times within a pre-determined time frame, as the application demands. If, at the step 32, the process method returns TRUE, a step 34 is executed. At the step 34, the exemplary process method determines a second taxi-start location parameter for a substantially autonomous vehicle to navigate to. Preferably, the user supplied input via an appropriate user-interactive interface is wherein the input is a second taxi-start location parameter that is non-matched at least in an aspect to the previously inputted first taxi-start location parameter and wherein, in geographical terms and measurements, the second taxi-start location parameter is between 12 meters and 4502 meters distant from the first taxi-start location parameter in any arbitrary direction and/or radius. This distance is inclusive of geographical limitations and impediments to straight directional travel, such as mountains, gullies, dense built-up areas, government land, private property, water travel paths, dense forests and the like. The second taxi-start location parameter preferably comprises at least one differential geographical identification coordinate to the first taxi-start location parameter, or at least one address number that is differentiated. For example, the locational coordinates of the second taxi-start location parameter may be 25, 28 and the locational coordinates of the first taxi-start location parameter may be 25, 43. The address of the second taxi-start location parameter may be 27 Mayville Road, and the address of the first taxi-start location parameter may be 43 Irving Court. The address of the second taxi-start location parameter may be Jessica White, and the address of the first taxi-start location parameter may be 35 Greene Road. Those with ordinary skill in the art will readily recognize suitable alternatives. The State or Country identifier is expected in most cases to be the same, however, in a few select instances, the State or Country identifier may be different. The second taxi-start location parameter is expected to be the taxi-start location that a requested substantially autonomous vehicle will navigate to in order to collect one or more patrons that may be the user of the mobile communications device, or persons or physical items associated with the user of the mobile communications device. As the second taxi-start location parameter is geographically distinct and differentiated to the first taxi-start location parameter, wherein the distinctness is between 12 meters and 4502 meters distant, the transit time for a selected or pre-determined substantially autonomous vehicle to reach the selected or user-inputted second taxi-start location parameter may be more or less than the transit time for a selected or pre-determined substantially autonomous vehicle to reach the selected or user-inputted first taxi-start location parameter. As such, different cost metrics may apply if the selected or pre-determined substantially autonomous vehicle is an asset of a commercial service, such as a ride-sharing service or a goods and/or services delivery service. The costs may be greater or less. In a non-limiting example, the commercial service may optionally incorporate a cost discount, or at least no additional cost, to the user of the mobile communications device if the distance distinction between the first taxi-start location parameter and the second taxi-start location parameter is closer to the 12 meter mark. If the determination of the step 34 returns FALSE, the first set of processor readable programmatic instructions may execute a step 50 terminating the process method. Alternatively, upon termination of the process method, the process method may regenerate or be re-executed by the processor beginning with the step 30. Alternatively, the step 34 may reiterate through a pre-determined plurality of times with FALSE being returned a pre-determined number of times prior to the step 50 being executed. If the step 34 returns TRUE, a step 36 is executed by the first set of processor readable programmatic instructions. At the step 36, a determination is made as to whether a second set of processor readable programmatic instructions is active and being processed by the processor. The determination further includes determining that an active plurality of electrical output signals sent by the processor to the user-interactive interface does not comprise data, output or returns generated by the second set of processor readable programmatic instructions. This determination may be partially or fully made by the processor processing and sending a plurality of output signals to the user-interactive interface, wherein the plurality of output signals does not comprise output signals from the second set of processor readable programmatic instructions and this status quo does not change until at least the second taxi-start location parameter has overridden the first taxi-start location parameter. This determination may further be made by the processor, ensuring via feedback processes, that there are minimal errors in the output electrical signals currently being sent to the user-interactive interface (i.e. no output electrical signals comprising data from the second set of processor readable programmatic instructions). The second set of processor readable programmatic instructions is processed by the processor to maintain a secure channel of communication via a wireless and/or wireless communications protocol (e.g. DSL, satellite, fibre optic, copper, cellular network, wireless area networks, etc.) with a third party server to perform or facilitate the steps of: generating news items, attaching information links, attaching active links, limiting the number of viewers of the news items, and assigning an order. The secure channel of communication may, for example be SSL, or another encrypted protocol serving a purpose of encrypting communications between a client device and a third party server located beyond the client device's Local Area Network, or derivatives or substitutes thereof. The third party server, which is preferably a social network provider, for example, may be any computer system, plurality of interworking computer systems, microprocessors, CPUs, or any other hardware and/or software combination adapted to execute one or more sets of processor readable programmatic instructions to perform the steps of: generating news items, attaching information links, attaching active links, limiting the number of viewers of the news items, assigning an order, and sending or transmitting the assigned order to the client device (i.e. the mobile communications device of the present disclosure). The user of the mobile communications device on which the second set of processor readable programmatic instructions is processed and executed may have previously, via the second set of processor readable programmatic instructions, performed parameter-defining steps or toggles in order to determine user specific limitations relating to the steps of: generating news items, attaching information links, attaching active links, limiting the number of viewers of the news items, assigning an order. As the step 36 is executed by the processor, the second set of processor readable programmatic instructions is actively performing or executing the steps of: generating news items, attaching information links, attaching active links, limiting the number of viewers of the news items, assigning an order. If the step 36 returns FALSE, the process method may terminate at the step 50. If the step 36 returns TRUE, a step 38 is executed. At the step 38, a determination is made to determine if the user-supplied input at the user-interactive interface consisting of the second taxi-start location parameter was inputted between 6 seconds and 5581.2 seconds after the generation or user-input of the first taxi-start location parameter. The determination may be a basic time difference between the execution of aspects of processor readable programmatic instructions (which may, in some instances, be the first set of processor readable programmatic instructions) for registering and processing a first taxi-start location parameter and the execution of the first set of processor readable programmatic instructions for registering and processing a second taxi-start location parameter. If the user-supplied input consisting of the second taxi-start location parameter was not generated between 6 and 5581.2 seconds after the generation of the first taxi-start location parameter, the process method terminates and the second taxi-start location parameter does not override the first taxi-start location parameter. If the user-supplied input consisting of the second taxi-start location parameter was generated between 6 and 5581.2 seconds after the generation of the first taxi-start location parameter, the process method returns TRUE, and a step 40 is executed. At the step 40, the process method generates a transmissible data packet comprising an information signal comprising an instruction to override the first user-inputted taxi-start location parameter with the second user-inputted taxi-start location parameter; the instruction is inclusive of the user-inputted second taxi-start location parameter. The data packet may be a single data packet comprising the information load, or a plurality of data packets with each data packet comprising an equal or unequal portion of the total required information load. The one or more data packets comprising the instruction to override the first taxi-start location parameter with the second taxi-start location parameter, inclusive of the second taxi-start location parameter, may further include additional non-related information or data as the application requires. The one or more data packets generated may be generated to be compliant with the particular transmission parameters of the wireless communications network(s) the mobile communications device is connected to, including bandwidth parameters, modulation parameters, and the like. At the step 42, the process method directs the electromagnetic transmission of a data packet comprising the second taxi-start location parameter from the mobile communications device to the controller or processor of a substantially autonomous vehicle assigned to travel to the user-defined taxi-start location parameter. The electromagnetic signal comprising the data packet may travel directly to the receiving antenna of the appropriate substantially autonomous vehicle, or may travel via one or more terrestrial antennas/relays and/or orbital bodies, such as one or more satellites to the receiving antenna of the appropriate substantially autonomous vehicle. In some instances, the electromagnetic signal comprising the data packet may be directed to an intermediate aspect, wherein the intermediate aspect is a central processing network adapted to process user-defined requests and parameters for a substantially autonomous vehicle taxi-service. This intermediate aspect may receive the electromagnetic signal comprising the data packet, recognize the request, discover an appropriate substantially autonomous vehicle to service the request, which may or may not be the same substantially autonomous vehicle previously dispatched to the first taxi-start location parameter, convert the request into an appropriate format recognized by the processor/controller/electronics of the substantially autonomous vehicle and if necessary, modify the request with additional pertinent parameters, such as updated costing parameters, updated destination schedules for the substantially autonomous vehicle in question, and the like. Subsequent to this, the intermediate aspect may generate a further electromagnetic signal comprising one or more data packets comprising the second taxi-start location parameter to override the first taxi-start location parameter, along with any additional affixed parameters as described previously. This further electromagnetic signal is transmitted to the receiving antenna of the appropriate substantially autonomous vehicle. In some cases, an additional electromagnetic signal may be generated by the intermediate aspect comprising the updated costing parameters, for example. This additional electromagnetic signal may be transmitted back to the mobile communications device of the present disclosure and adapted to be processed by the processor and a set of processor readable programmatic instructions which in some instances may be the first set of processor readable programmatic instructions, and outputted to the user via one or more electrical signals sent to the user-interactive interface. At a step 44, the process method listens for a confirmation data packet from the controller of the substantially autonomous vehicle dispatched to the second taxi-start location parameter and/or the intermediate aspect. This confirmation data packet, which in some instances may be a plurality of data packets, comprises information confirming that the second taxi-start location parameter is the taxi-start location parameter that the substantially autonomous vehicle will navigate to in order to service the user's transport request. At a step 46 the process method determines if the confirmation data packet has been received. If the step 46 returns TRUE, a step 48 is executed. At the step 48, an output signal consisting of one or more electrical signals is generated and sent to the user-interactive interface confirming the second taxi-start location parameter is the taxi-start location parameter that the substantially autonomous vehicle will navigate to in order to begin a user-requested transport journey to at least one pre-determined destination location. The user discernible output may be a graphical display, text, voice, or video confirmation. In some instances, the confirmation data packet may instead, or in addition, be a series of GPS-based or otherwise geolocational-based data packets depicting the substantially autonomous vehicle maneuvering its travel route on a viewable map associated with the first set of processor readable programmatic instructions, as described further in this disclosure. If the step 46 returns FALSE, the process method returns to the step 44. This may iterate through a pre-determined number of times, or until the process method returns TRUE. A failure to receive a confirmation data packet at the step 46 after a pre-determined time-window has lapsed may indicate that the data packet comprising the second taxi-start location parameter was not successfully processed and affirmed by the substantially autonomous vehicle and/or the intermediate aspect, meaning the substantially autonomous vehicle is still set to arrive at the originally requested location at the originally requested time or time-frame or time-window. This may be because the data packet was not successfully processed by the intermediate aspect and/or the controller of the substantially autonomous vehicle due to errors in transmission via the wireless communications network, due to errors in the circuitry or software of the mobile communications device and/or the substantially autonomous vehicle, due to an outage or errors in the computer systems and/or software systems of the intermediate aspect, or due to the request for the second taxi-start location parameter to override the first taxi-start location parameter not complying with one or more of the limitations described in the exemplary process method.

After the step 48 has been successfully executed through, the process method is terminated at the step 50.

If, at any stage of execution of this exemplary embodiment process method, the first set of processor readable programmatic instructions encounters an interruption, upon resolving the interruption, the process method may resume at the step that was being executed prior to the interruption. In some embodiments, for energy conservation or efficiency reasons, such resuming of the process method after an arbitrary or pre-determined period of interruption may not be possible or desirable. In such instances, the process method may be forced to be re-executed or re-processed from the step 30, the step 32, or the step 34.

In alternative embodiments of this process method, in order to ensure a streamlined and energy efficient process, one or more returns of FALSE by the first set of processor readable programmatic instructions may not immediately result in the termination of the process method. In some embodiments, termination of the process method may not occur until the process method has executed through all steps to their logical conclusion and satisfactory results are not returned that would enable an effective registering and processing of a second taxi-start location parameter for a substantially autonomous vehicle to navigate to and overriding of a previously user-inputted or selected first taxi-start location parameter. In some embodiments, some of which will be explained with the assistance of further figures in this disclosure, one or more of the steps described above may be rearranged into a different order, or one or more of the steps may be eliminated without departing from the spirit and scope of the present disclosure. For example, in some embodiments, to assist energy efficiency and overall effectiveness, the step 46 may be eliminated.

The transmission of the data packet by the mobile communications device and/or the data packet transmitted by the intermediate aspect, may involve generating a first modulated electromagnetic signal and a second modulated electromagnetic signal, wherein the first modulated electromagnetic signal and the second modulated electromagnetic signal are spacially distinct by at least a pre-determined order of angular, frequency, amplitude or phase magnitude and wherein in some instances neither the first modulated electromagnetic signal nor the second modulated electromagnetic signal comprise the centre frequency, and modulating the data packet into controller-readable and reconstructable aspects of the first modulated electromagnetic signal and the second modulated electromagnetic signal, respectively. Exact copies of the data packet may additionally be generated and transmitted by the mobile communications device and/or the intermediate aspect in order to account for, and overcome, losses such as atmospheric absorption, multi-path fading, bit-error-ratio deficiencies, and the like, as those with ordinary skill in the art will readily understand. The first modulated electromagnetic signal and the second modulated electromagnetic signal may be any appropriate radio wave or microwave or light or infrared wave. It is imperative that the data packet retains its structural integrity whilst being transmitted through the atmospheric or free-space medium between the mobile communications device and the substantially autonomous vehicle or between the mobile communications device and the intermediate aspect and between the intermediate aspect and the substantially autonomous vehicle. It may be desirable if copies of the data packet are not needed to reconstruct the data of the second taxi-start location parameter at the receiving antenna and/or controller of the substantially autonomous vehicle and/or the intermediate aspect, as sending the change of taxi-start location parameter request efficiently and quickly is critical in order to satisfy consumer demands and to reroute the substantially autonomous vehicle to service other consumers as efficiently as possible in order to minimize costs, maximise revenues, and ensure positive or continued positive reputation of the substantially autonomous vehicle taxi-service owner or operator. Copies of the interruption signal may involve additional time-length. Hence, in line with this, it may be desirable for the first modulated electromagnetic signal and the second modulated electromagnetic signal to be captured as a waveform with the spatially distinct characteristics substantially removed by the intermediate aspect receiving and processing the first modulated electromagnetic signal and the second modulated electromagnetic signal and/or the receiving antenna and/or controller coupled to the substantially autonomous vehicle receiving and processing the first modulated electromagnetic signal and the second modulated electromagnetic signal.

In the above preferred embodiment, the determination at the step 36 may be additionally made by checking the size of the memory (in a standard such as "bytes" or some derivative or substitute thereof) allocated to data or information intended to be converted into electrical signals to be sent to be outputted at the user-interactive interface compared to the relative size of the required outputs for the first set of processor readable programmatic instructions and the second set of processor readable programmatic instructions. The determination at the step 36 may be made by the processing of the second set of processor readable programmatic instructions by the processor involving the usage of less memory and processing to store and process data related to the second set of processor readable programmatic instructions compared to when the second set of processor readable programmatic instructions involves sending one or more electrical signals comprising data to be outputted at the user-interactive interface and/or the processing of the second set of processor readable programmatic instructions by the processor wherein processing does not include executing programmatic instructions to send one or more output electrical signals to the user-interactive device comprising data from the second set of processor readable programmatic instructions. In some embodiments, the determination step 36 may be performed reiteratively independently, as well as simultaneous or substantially simultaneous to one or more of the other steps of the process method.

Where processing power or capacity of the processor coupled to the mobile communications device to enable processing of the process methods of the present disclosure allows, some of these described steps may be executed in parallel where appropriate. For example, the steps 34, 36, and 38 may be executed simultaneously, close to simultaneously, or otherwise in parallel. However, it would be less appropriate for the steps 30, 32, and 34 to be executed simultaneously, close to simultaneously, or otherwise in parallel.

Alternative embodiments of the exemplary process method of FIG. 1 will now be detailed and described with reference to FIGS. 2-11.

Figure 2:
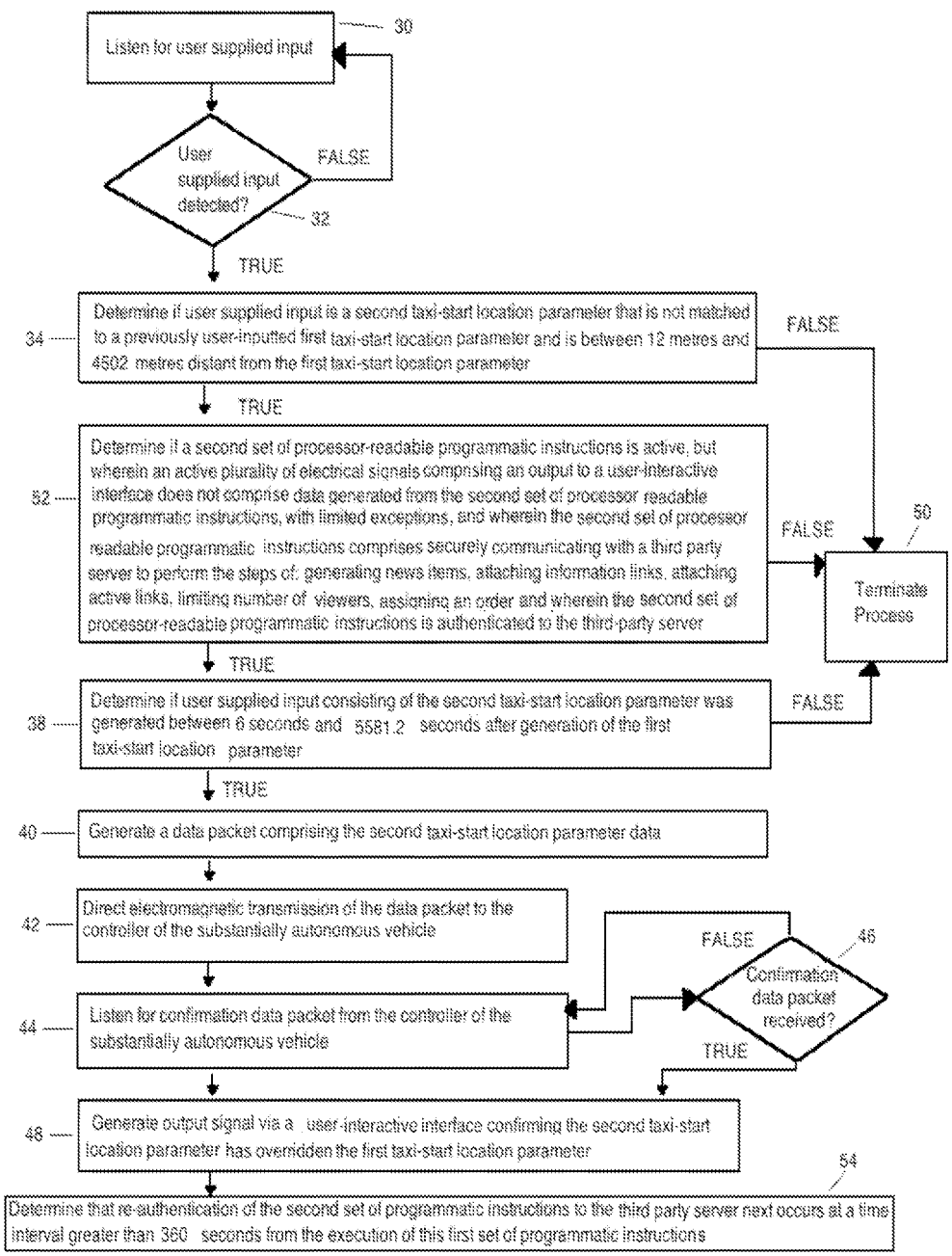
FIG. 2 shows an alternative embodiment flow diagram of a process method of the present disclosure.

Turning now to FIG. 2, an alternative embodiment process method is depicted. The process method steps of FIG. 2 are the same as the exemplary embodiment, with the differentiating steps being a step 52 instead of the step 36 and a step 54 being executed after the step 48 in the embodiment presented. The difference between the step 38 and the step 52 is that the step 52 comprises the additional parameter of ensuring that the second set of processor readable programmatic instructions is sufficiently authenticated to the third party server. This generally means authentication details such as a username and/or password or other encrypted or secret code is not required prior to the simultaneous or substantially simultaneous processing of the second set of processor readable programmatic instructions by the processor with the processing of the first set of processor readable programmatic instructions by the processor during at least a portion of the first pre-determined period of time. Authentication of the second set of processor readable programmatic instructions may be via an encryption algorithm such as SSL or appropriate derivatives and substitutes thereof. The step 52 also comprises the additional parameter (i.e. the limited exceptions aspect) of the second set of processor readable programmatic instructions being operable to generate output signals simultaneous to the generation of output signals by the first set of processor readable programmatic instructions wherein the output signals generated by the second set of processor readable programmatic instructions occupies no more than seven and a quarter eighths of the total user-interactive area of an electronics display screen comprising the user-interface device and a minimum of a twentieth of a first eighth of the user-interactive area of the electronics display screen. If the limited output signals generated by the second set of processor readable programmatic instructions are audio, such audio output signals are extant, in sum, for preferably no more than 27 seconds, and less preferably up to a maximum of 5572.2 seconds In derivative embodiments, the step 54 may be executed iteratively before, after, or simultaneous with any of the steps 30, 32, 34, 36, 38, 40, 42, 44, 46, 48 as the application requires. At the step 54, a determination is made that re-authentication of the second set of processor readable programmatic instructions incorporating generating news items, attaching information links, attaching active links, limiting the number of viewers of the news items, and assigning an order to the appropriate third-party server at least occurs after a time of 360 seconds has elapsed after the initiation of the execution of the first set of processor readable programmatic instructions, and specifically aspects related to overriding a first taxi-start location parameter with a non-matching second taxi-start location parameter. Such re-authentication may typically involve requiring the user of the second set of processor readable programmatic instructions to re-input their username and/or password details and/or other type of authentication details either manually or automatically. Prior to that, re-authentication may not occur except for a failing of electrical hardware, such as memory or electrical power supply, the failing of which negatively affects all sets of processor readable programmatic instructions currently being executed by the processor.

Figure 3:
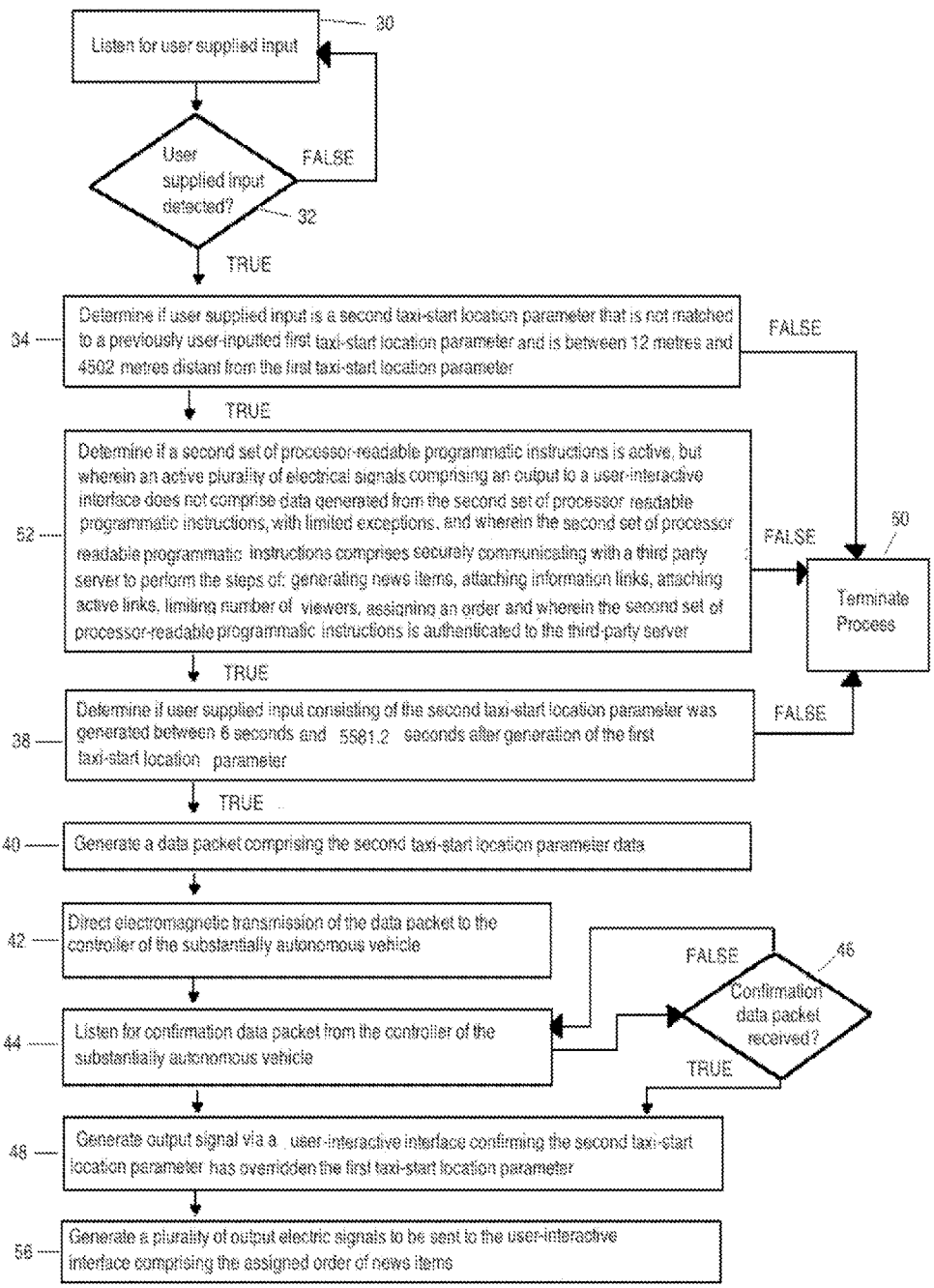
FIG. 3 shows an alternative embodiment flow diagram of a process method of the present disclosure.

In all applicable embodiments, the exception to the respective determinations performed by the steps 36 and 52 is wherein the second set of processor readable programmatic instructions performs the respective steps of: generating news items, attaching information links, attaching active links, limiting the number of viewers of the news items, and assigning an order and wherein at an instance in time simultaneous with an instance in time in which the first set of processor readable programmatic instructions is being executed and sending output electrical signals to the user-interactive interface, the second set of processor readable programmatic instructions may generate and send a limited plurality of output electrical signals to manifest as an output parameter at the user-interactive interface. Such limitations include ensuring that a graphic, motion-based graphic, or string of textual characters manifesting at the user-interactive interface as a result of the output electrical signals generated by the second set of processor readable programmatic instructions are limited in their electronics display manifestation physical dimensions to occupy no more than seven and a quarter eighths of the total user-interactive area of an electronics display screen utilized as the user-interface device and a minimum of a twentieth of a first eighth of the user-interactive area of the electronics display screen. If the limited output electrical signals generated by the second set of processor readable programmatic instructions are audio, such audio output signals are extant, in sum, for preferably no more than 27 seconds, and less preferably up to a maximum of 5572.2 seconds Turning now to FIG. 3, an alternative embodiment process method is depicted. The process method steps of FIG. 3 are the same as the alternative embodiment of FIG. 2, with the differentiating step being a step 56 being executed after the step 48 in the embodiment presented. At the step 56, a plurality of output electrical signals are generated and sent to the user-interactive interface. The plurality of output electrical signals comprises data from the second set of processor readable programmatic instructions actively being processed by the processor, and specifically an assigned order of news items retrieved from communications with the third-party server. The step 56 may be substantially user-centric and user-controlled, i.e. via an appropriate user-data input device, such as a touch-pad, a microphone, a motion sensor, and the like. Since the second taxi-start location parameter has successfully been implemented via the prior steps of this process method, the need for non-distraction by a social media network is substantially reduced and hence this step enables effective communication with, or viewing of activities and events of, friends, family, comrades, associates, partners, strangers, and the like without restriction. The step 56 may be executed within a pre-determined or arbitrary amount of time after the execution of the step 48. Such amount of time may be substantially user-defined.

Figure 4:
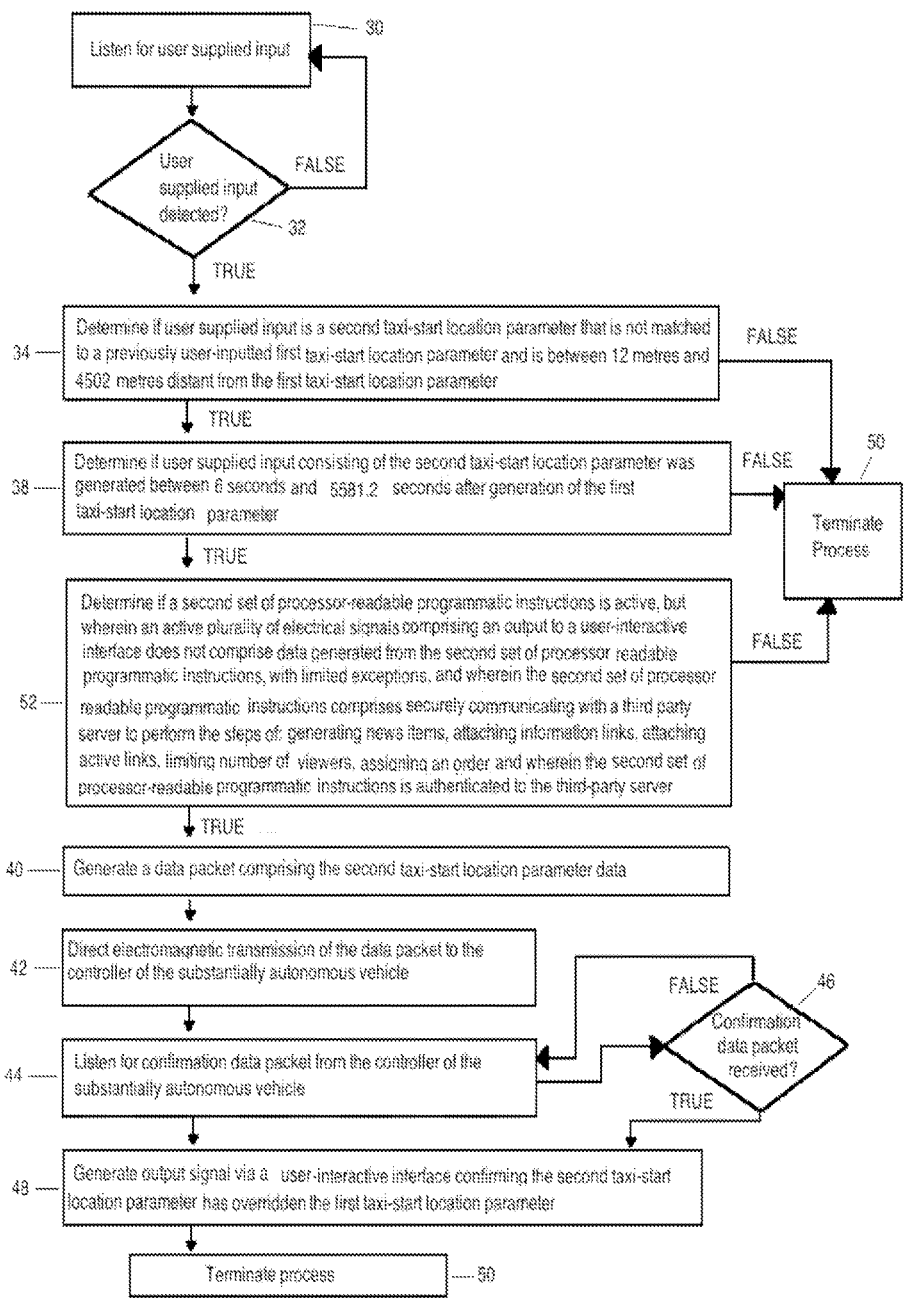
FIG. 4 shows an alternative embodiment flow diagram of a process method of the present disclosure.

Turning now to FIG. 4, an alternative embodiment process method is depicted. This alternative embodiment presents a non-limiting rearrangement of a select number of the steps of the alternative embodiment of FIG. 2. Specifically, the step 38 and the step 52 are reversed in their executional order. In this embodiment, the step 38 occurs prior to the step 52. That is, At the step 38, a determination is made to determine if the user-supplied input at the user-interactive interface consisting of the second taxi-start location parameter was selected or inputted between 6 seconds and 5581.2 seconds after the generation or user-input of the first taxi-start location parameter. If the user-supplied input consisting of the second taxi-start location parameter was not generated between 6 and 5581.2 seconds after the generation of the first taxi-start location parameter, the process method terminates and the second taxi-start location parameter does not override the first taxi-start location parameter. If the user-supplied input consisting of the second taxi-start location parameter was generated between 6 and 5581.2 seconds after the generation of the first taxi-start location parameter, the process method returns TRUE, and the step 52 is executed. However, it should be noted that in some derivative embodiments, the steps 38 and steps 52 may be executed simultaneously, close to simultaneously, or otherwise in parallel. If the processing power or capacity of the mobile communications device does not allow for substantial parallel processing, the step 38 is prioritized to be executed prior to the step 52. After the step 48, the process method terminates at the step 50.

Figure 5:
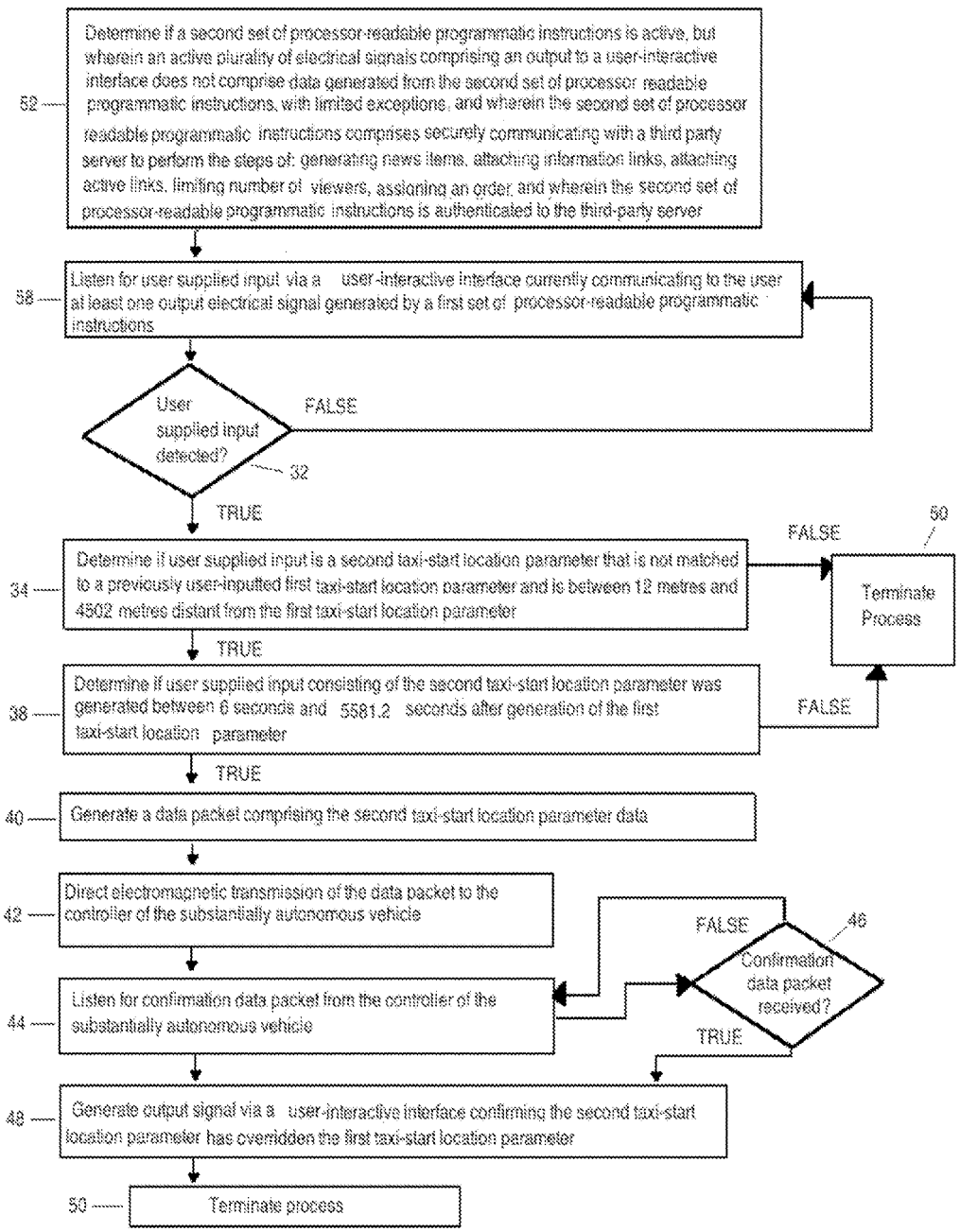
FIG. 5 shows an alternative embodiment flow diagram of a process method of the present disclosure.

Turning now to FIG. 5, an alternative embodiment process method is depicted. This alternative embodiment presents a non-limiting rearrangement of a select number of the steps of the alternative embodiment of FIG. 2 and a substitute step. Specifically, the step 52 is arranged to be executed prior to a substitute step 58 (substituting the step 32), wherein the step 58 includes listening for user-supplied input via a suitable user-interactive interface currently communicating to the user at least one output electrical signal generated by the first set of processor readable programmatic instructions. After the successful execution of the step 34 and a return value of TRUE, the step 38 is subsequently executed. After the step 48, the process method terminates at the step 50. In this embodiment, it may be advantageous from a non-distraction stance to determine that the second set of processor readable programmatic instructions is not generating substantial output electrical signals beyond the scope of appropriate limitations and restrictions before executing the process method further by prompting user input for the second taxi-start location parameter.

Figure 6:
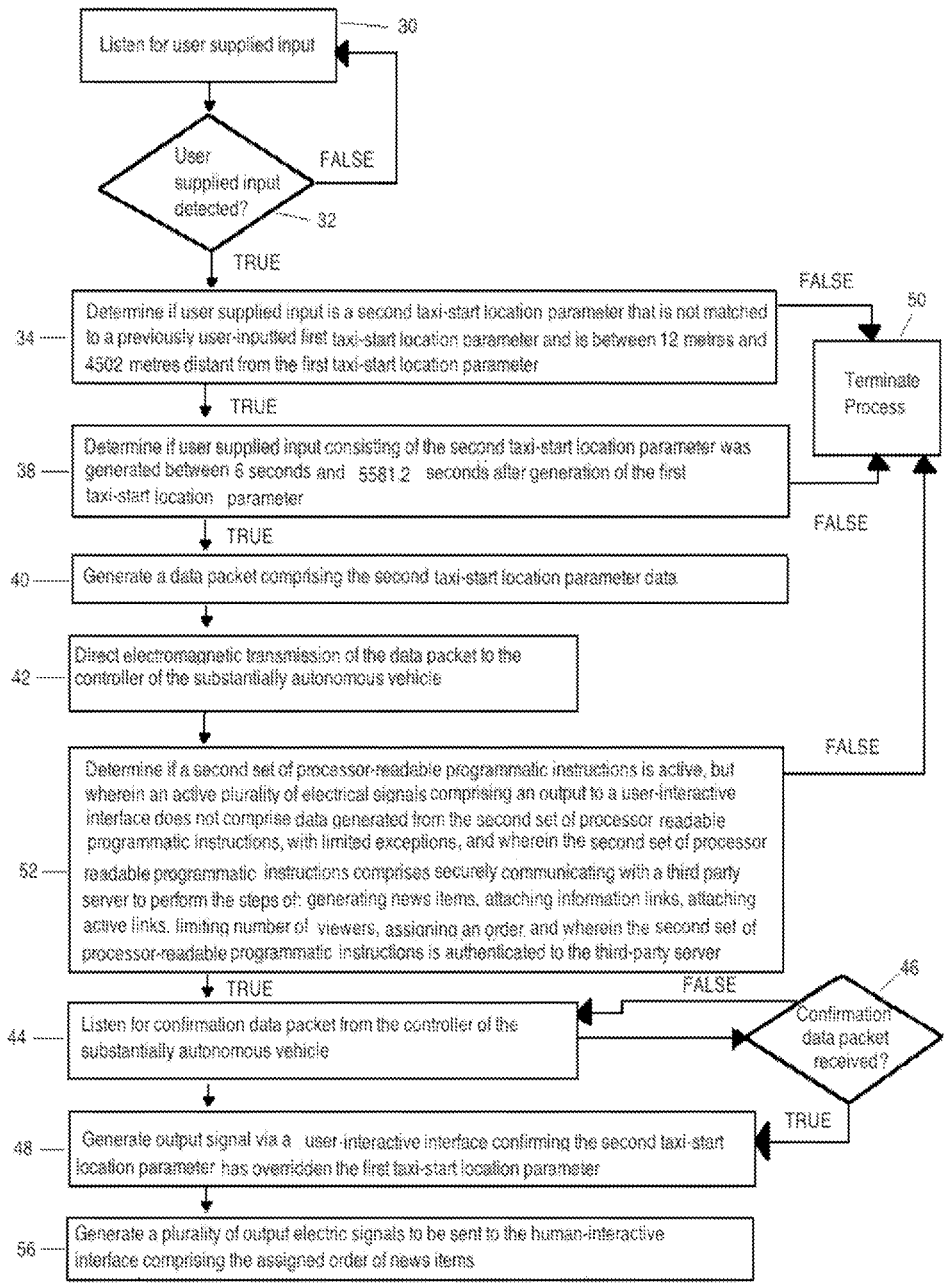
FIG. 6 shows an alternative embodiment flow diagram of a process method of the present disclosure.

Turning now to FIG. 6, an alternative embodiment process method is depicted. This alternative embodiment presents a non-limiting rearrangement of a select number of the steps of the alternative embodiment of FIG. 2. Specifically, upon successful execution of the step 34, the step 38 is subsequently executed. Upon the successful execution of the step 38, the steps 40 and 42 are executed, respectively. In this particular embodiment, the step 52 is interposed between the respective steps 42 and 44. It should be noted that in some instances, where processing capabilities and memory resources allow, the steps 34 and 38 may be executed substantially simultaneously or in parallel. It should be noted that although the step 52 is, in this embodiment, executed between the steps 42 and 44, it may, where hardware and/or software resources allow, be executed simultaneously, substantially simultaneously, or otherwise in parallel with one or more of the other steps 30, 32, 34, 38, 40, 42, 44, 48, 56.

Figure 7:
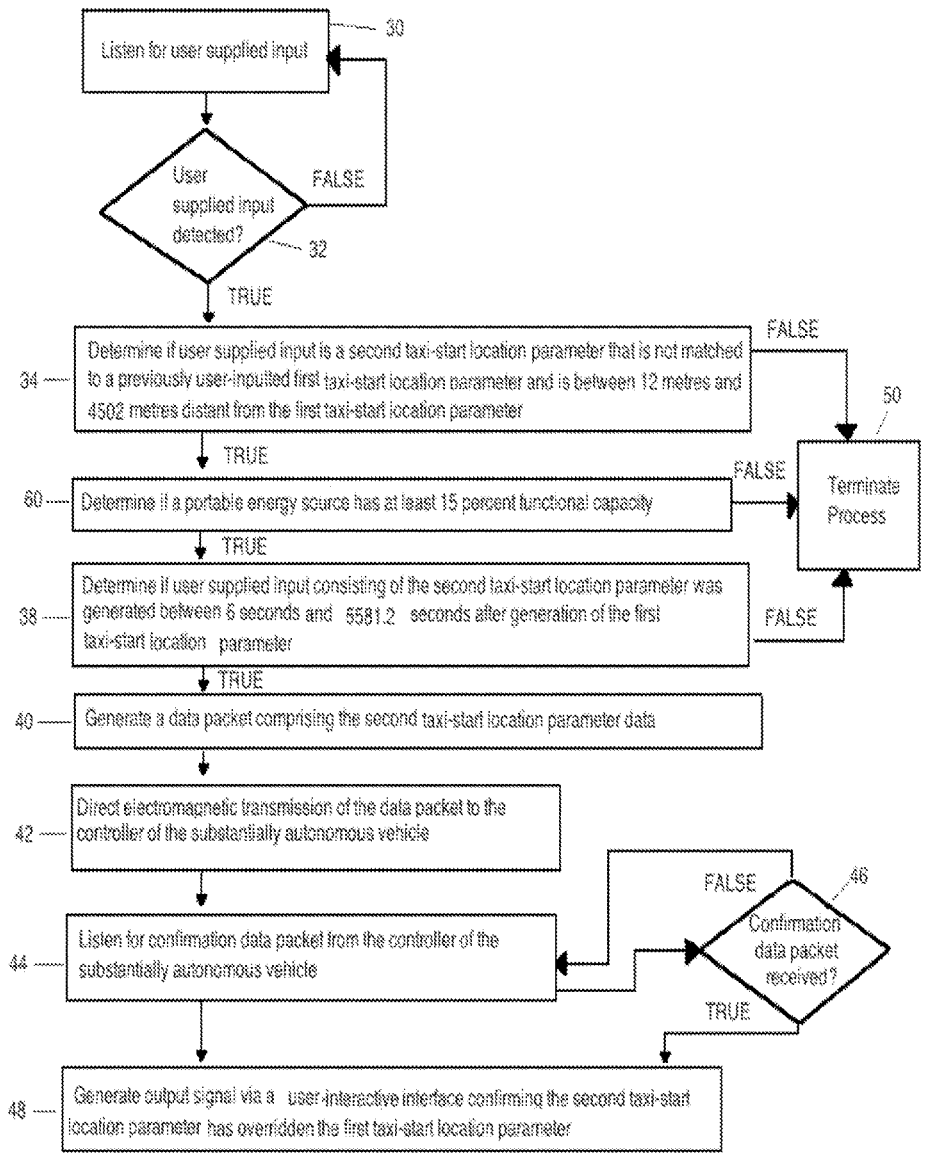
FIG. 7 shows an alternative embodiment flow diagram of a process method of the present disclosure.

Turning now to FIG. 7, an alternative embodiment process method is depicted. This alternative embodiment presents a non-limiting rearrangement and substitution of a select number of the steps of the alternative embodiment of FIG. 2. Specifically, the determining step 52 is substituted with a step 60. The step 60 is, in this non-limiting embodiment, interposed between the steps 34 and 38, respectively. At the step 60, a determination is made to ensure that a portable energy source powering the mobile communications device and hence enabling the first set of processor readable programmatic instructions to be executed by the processor is at least at 15 percent total capacity of electrical energy remaining, but preferably a higher capacity of electrical energy remains that can be discharged. This is to ensure another aspect of non-distraction to the user while performing the respective steps of overriding the first taxi-start location parameter with the second taxi-start location parameter. If insufficient electrical energy remains stored in the portable energy source to be discharged, the user may be unable to efficiently modify the taxi-start location parameter. Ensuring that the required energy amount remains may be determined by further sets of processor readable programmatic instructions executed by the processor which monitors the electrical energy capacity remaining in the portable energy source and modifies the operation of various aspects of the mobile communications device, such as screen display brightness or average or instantaneous processor energy usage, in response to various electrical energy capacity thresholds being met. In this non-limiting embodiment, if the electrical energy capacity of the portable energy source is below 15 percent, the process method is terminated at the step 50. It should be noted that in some embodiments, the determination step 60 may be performed reiteratively and simultaneous to, substantially simultaneous to, or substantially in parallel with the execution of one or more of the steps of 30, 32, 34, 38, 40, 42, 44, 46, and 48.

Figure 8:
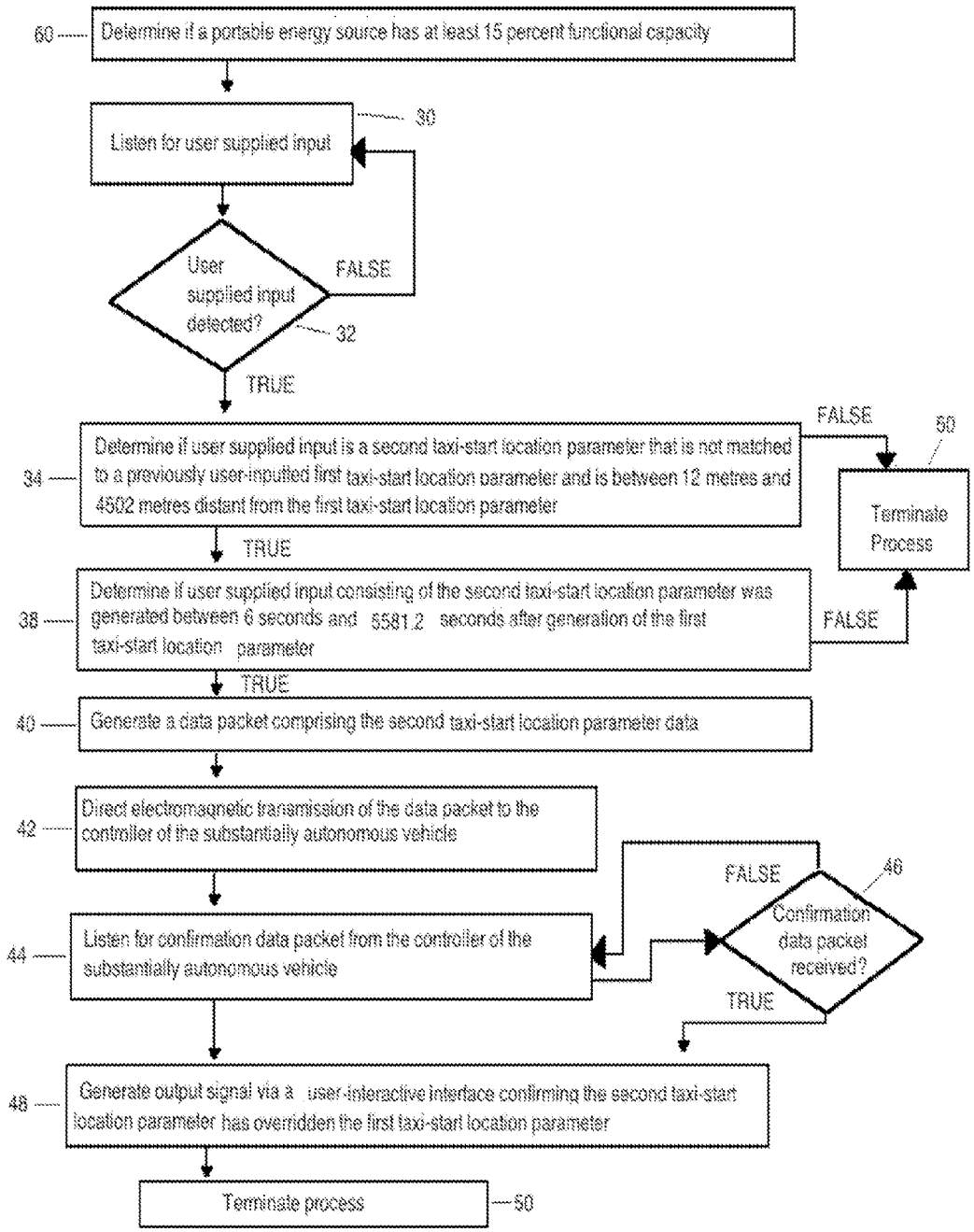
FIG. 8 shows an alternative embodiment flow diagram of a process method of the present disclosure.

Turning now to FIG. 8, an alternative embodiment process method is depicted. This alternative embodiment presents a non-limiting rearrangement of a select number of the steps of the alternative embodiment of FIG. 7. Specifically, the step 60 is executed prior to the step 30. Hence, in this embodiment, compared to the embodiment of FIG. 7, the successful execution of the step 34 is followed by the step 38. If the determination at the step 60 is not successful in resulting with the desired outcome, it may not be desirable for the process method to commence further, due to the possibility of enhanced distraction to the user desiring to substitute the first taxi-start location parameter with the second taxi-start location parameter. If the process method illustrated in this FIG. 8 is executed through to successful logical conclusion, the step 50 terminates the process method after the execution of the step 48.

Figure 9:
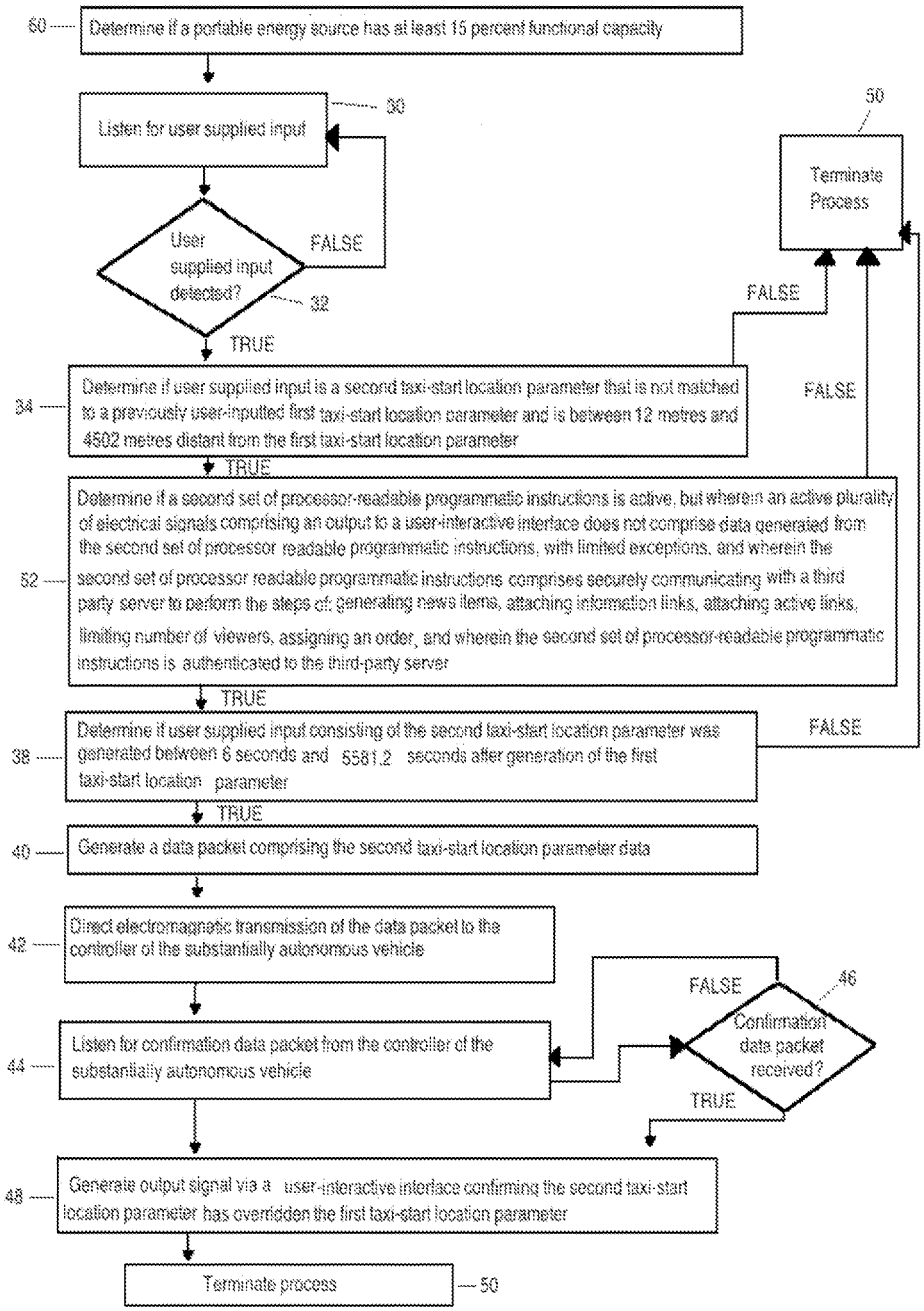
FIG. 9 shows an alternative embodiment flow diagram of a process method of the present disclosure.

Turning now to FIG. 9, an alternative embodiment process method is depicted. This alternative embodiment presents a non-limiting inclusion of an additional step over the alternative embodiment of FIG. 8. Specifically, step 52 is included in the process method. Step 52 is executed subsequent to the successful execution of the step 34. Following the successful execution of the step 52, the step 38 is executed. Although this is the presented order, it should be noted that the step 52 may be executed simultaneous with, or substantially in parallel with, one or more of the other steps of the process method. This alternative embodiment presents, for the first time in this disclosure, both steps (52 and 60) designed to reduce user distraction whilst the user attempts to override the first taxi-start location parameter with the second taxi-start location parameter.

Figure 10:
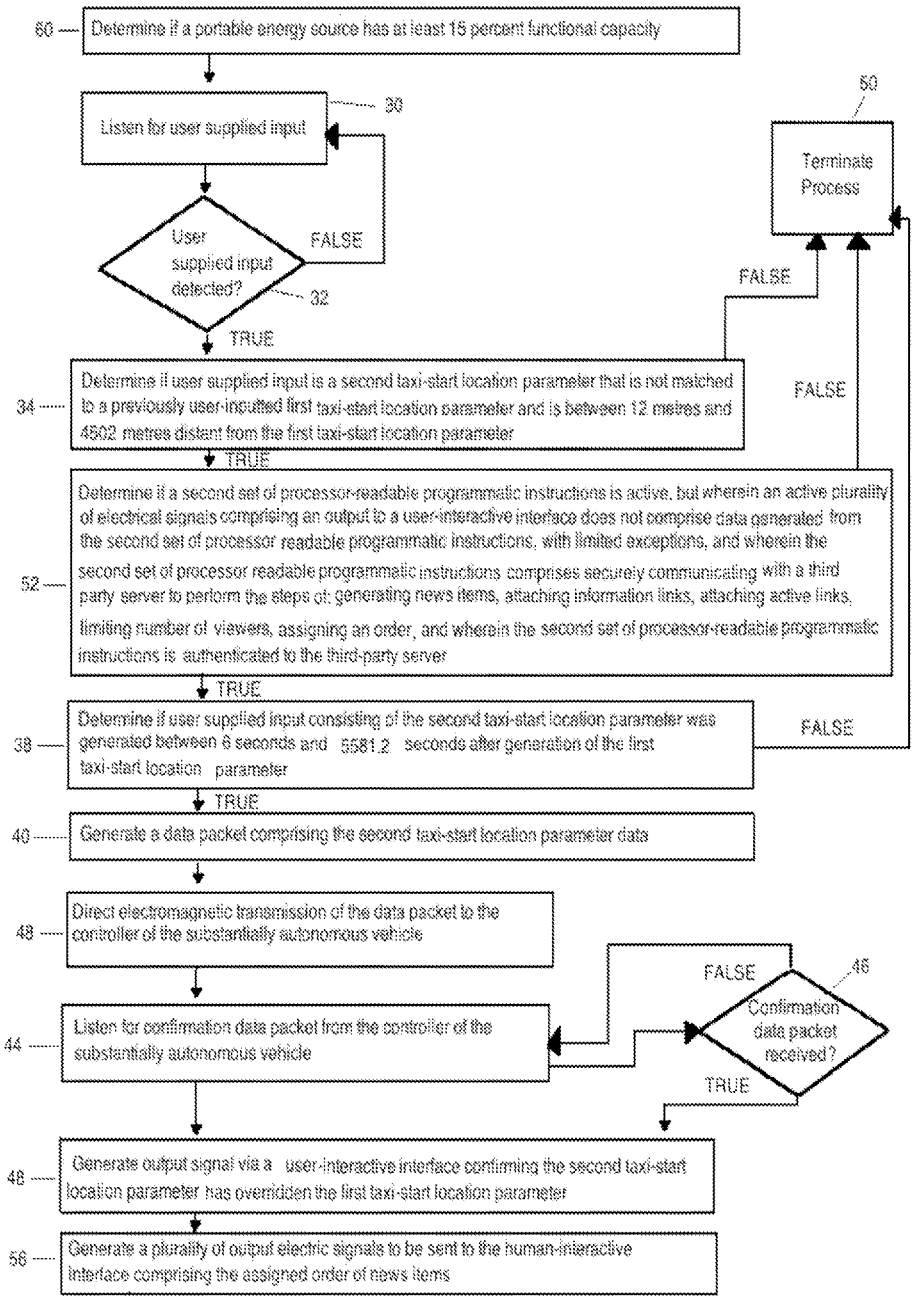
FIG. 10 shows an alternative embodiment flow diagram of a process method of the present disclosure.

Turning now to FIG. 10, an alternative embodiment process method is depicted. This alternative embodiment presents a non-limiting inclusion of an additional step over the alternative embodiment of FIG. 9. Specifically, at the logical conclusion of the step 48, the step 56 is subsequently executed wherein a plurality of output electrical signals are generated and sent to the user-interactive interface. The plurality of output electrical signals comprises data from the second set of processor readable programmatic instructions actively being processed by the processor, and specifically an assigned order of news items retrieved from communications with the third-party server. The step 56 may be substantially user-centric and user-controlled, i.e. via an appropriate user-data input device coupled to, or comprising an aspect of, the user-interface device, such as a touch-pad, a microphone, a motion sensor, and the like. Since the second taxi-start location parameter has successfully been implemented via the prior steps of this process method, the need for non-distraction is reduced and hence this step enables effective communication with, or the viewing of activities or events of, friends, family, comrades, associates, partners, strangers, and the like, without restriction. The step 56 may be executed within a pre-determined or arbitrary amount of time after the execution of the step 48. Such amount of time may be substantially user-defined.

Figure 11:
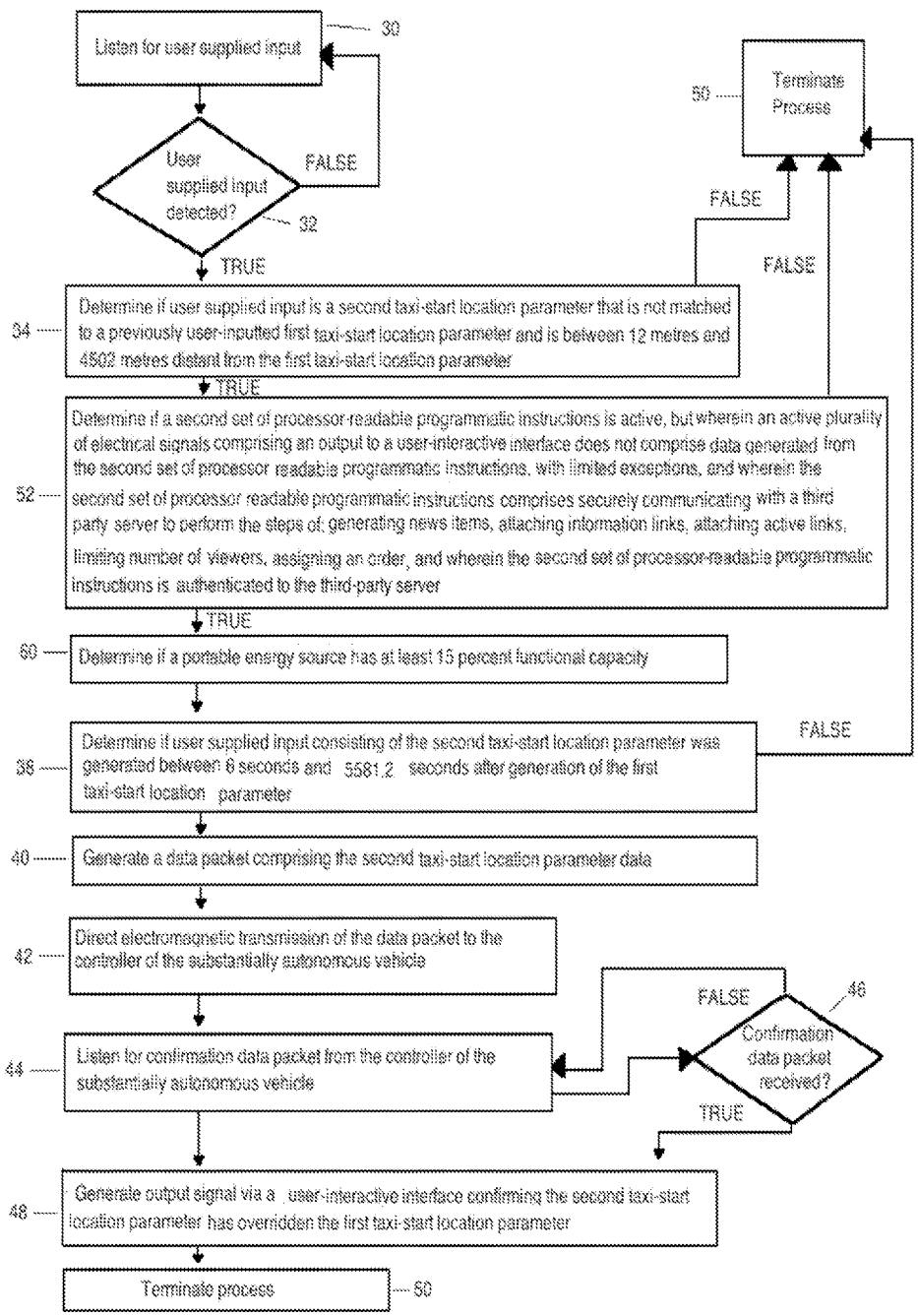
FIG. 11 shows an alternative embodiment flow diagram of a process method of the present disclosure.

Turning now to FIG. 11, an alternative embodiment process method is depicted. This alternative embodiment presents a non-limiting rearrangement of a select number of the steps of the alternative embodiment of FIG. 9. Specifically, the step 60 for determining the appropriate electrical energy capacity remaining in a portable energy source coupled to the mobile communications device is executed after the step 52 and prior to the step 38. The step 52, as in FIG. 9, is executed after the step 34. In some instances, it may be suitable, due to the availability of the necessary processor and memory resources, for the steps 52 and 60 to be executed substantially simultaneously, simultaneously, or otherwise in parallel thereof. Similarly, it may be suitable, due to the availability of the necessary processor and memory resources, for the steps 34 and 38 to be executed substantially simultaneously, simultaneously, or otherwise in parallel thereof. In the instances that this occurs, this means that the step 32 may be followed by the step 52, or the step 60 may be followed by the step 40. Similarly, in some instances, it may be suitable for the steps 34, 38, 52, and 60 to be executed substantially simultaneously, simultaneously, or otherwise in parallel.

Figure 12:
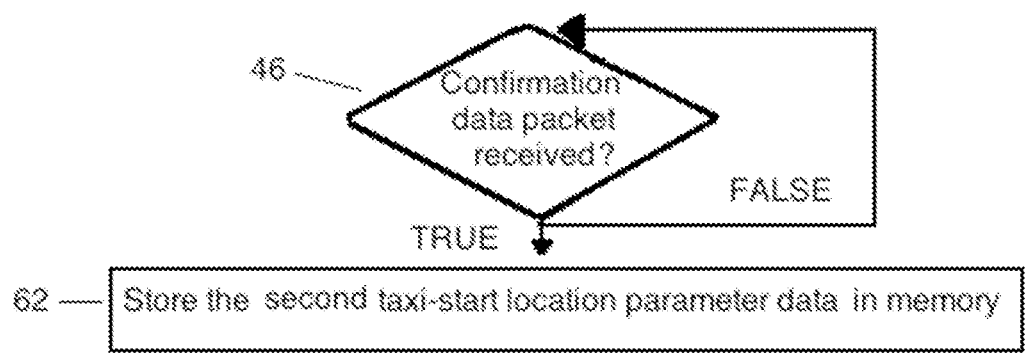
FIG. 12 shows a flow chart of an embodiment of a process method wherein, subsequent to the confirmation data packet being received, the data is stored in a memory unit.

FIG. 12 presents a flow chart of an embodiment of a process method wherein, subsequent to the confirmation data packet being received from the substantially autonomous vehicle or the intermediate aspect at the step 46 in any of the preferred or alternative embodiments presented in FIGS. 1 to 11, a step 62 is executed. At the step 62, the second taxi-start location parameter and/or the confirmation data packet is retrievably stored in a memory unit. The memory unit may be the same memory module used to retrievably store the first set of processor readable programmatic instructions and/or the second set of processor readable programmatic instructions, or the memory module may be a coupled memory module or a non-coupled memory module. For example, the memory module may be a magnetic disk drive, static or dynamic RAM or a derivative or substitute thereof, a solid state storage device, virtual memory, non-volatile memory, flash memory, ROM, PROM, EPROM, EEPROM, any appropriate combinations, and the like. Memory module may be hardware and/or software compartmentalized in the mobile communications device, or may be a memory module accessible via a preferably secure communications protocol, such as over a local area network or a wide area network—for example, a cloud storage device, or a remote computer server. Memory module may be located on any other appropriate electronics device, as the application requires.

Figure 13:
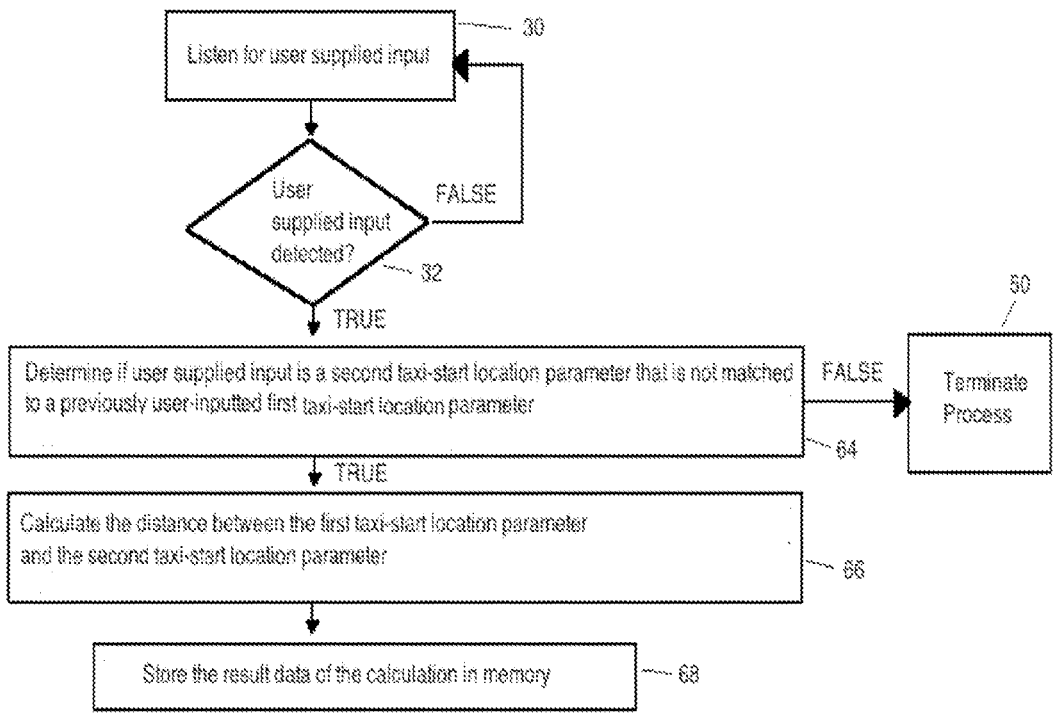
FIG. 13 shows a flow chart of an embodiment depicting a pertinent aspect of the present disclosure.

FIG. 13 presents a flow diagram of an embodiment of the present disclosure. The embodiment presented in this FIG. 13 may be executed by the first set of processor readable programmatic instructions substantially simultaneous with the execution of any of the preferred or alternative embodiments detailed in the FIGS. 1 to 11. The process method of this FIG. 13 begins with the execution of the respective steps of 30 and 32 until steps 30 and 32 have iterated through a pre-determined number of times, or until user supplied input is detected at the user-interactive interface. If user supplied input is detected at the user-interactive interface, a step 64 is executed. At the step 64, a determination is made as to whether the user supplied input is a second taxi-start location parameter that is not an exact match with a previously user supplied input of a first taxi-start location parameter. This determination may be made, for example, by comparing the size (e.g. bytes) occupied in memory or the processor resources consumed by, respectively, the first taxi-start location parameter and the second taxi-start location parameter. Alternatively, in another non-limiting example, this determination may be made by a match-determining algorithm to determine the similarities in the textual, image, audio, or positional characteristics of, respectively, the first taxi-start location parameter and the second taxi-start location parameter. If a result of a non-match is returned by the step 64, a step 66 is executed. If a result of a match is returned by the step 64, the process method is terminated at the step 50. At the step 66, the process method calculates the relative distance between the first taxi-start location parameter and the second taxi-start location parameter. Such calculation may be performed by an aspect of the first set of processor readable programmatic instructions adapted to perform such distance calculations—e.g. by measuring the distance between the first taxi-start location parameter and the second taxi-start location parameter via the units of distance utilized by a coupled map or other geographical positioning imagery, system, or device, or an aspect of the first set of processor readable programmatic instructions in coordination with an appropriate GPS module, or other distance tracking software and/or hardware. Such calculations may be performed to assist in determining that the distance between the second taxi-start location parameter and the first taxi-start location parameter is between 12 meters and 4502 meters in any arbitrary or pre-determined direction, in keeping with the requirements of the present disclosure. Additionally, the distance calculations may assist in calculation of the most appropriate substantially autonomous vehicle to navigate to the second taxi-start location parameter that will maximise the resources of the ride-sharing network, wherein the request for the second taxi-start location parameter is lodged as part of a ride-sharing service. Such calculations may be made, for example, by one or more substantially autonomous vehicles that are linked via a secure wireless communications protocol to at least one other substantially autonomous vehicle, or may be made by the intermediate aspect, or some combination thereof. Additional calculations performed by at least one substantially autonomous vehicle in secure wireless communications with at least one other substantially autonomous vehicle, or the intermediate aspect, is to utilize the distance calculation difference to determine appropriate costing parameters, such as the total cost required to be levied to the user's account linked to the intermediate aspect or one or more substantially autonomous vehicles for the substantially autonomous vehicle to transit from the second taxi-start location parameter to a pre-determined destination parameter and/or for the substantially autonomous vehicle to transit or navigate from the first taxi-start location parameter to the second taxi-start location parameter. After the execution of the step 66, a step 68 stores the resulting data of the distance calculation in an appropriate memory module. The resulting data of the distance calculation may be transmitted via a data packet modulated into a transmissible electromagnetic signal and transmitted to the intermediate aspect or the receiving antenna of the appropriate substantially autonomous vehicle simultaneous with the execution of the steps 40 and 42, respectively, or subsequent to the step 46, depending on the specific application requirements.

Figure 14:
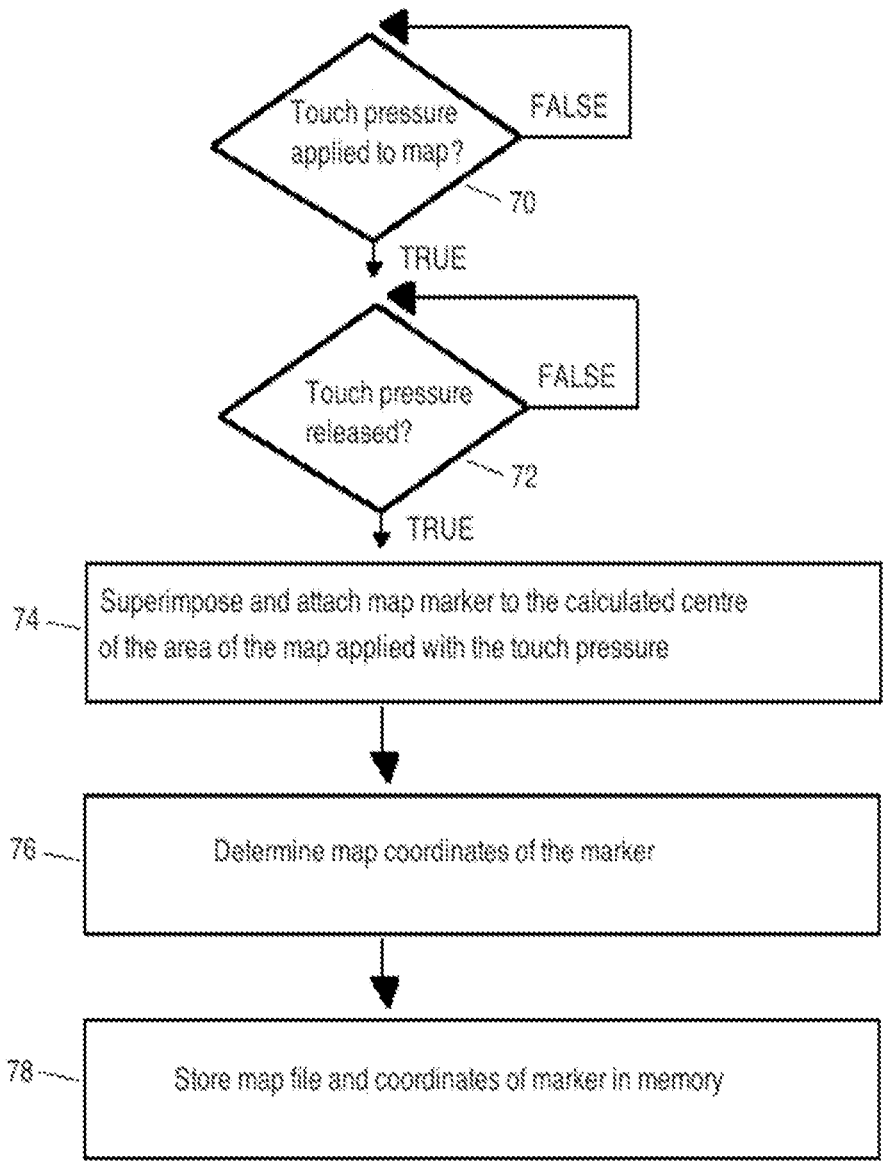
FIG. 14 shows an example embodiment process method of user-supplied input, facilitated by aspects of the user-interactive device, of the second taxi-start location parameter.

FIG. 14 depicts an example embodiment process method of user-supplied input, facilitated by aspects of the user-interactive device, of the second taxi-start location parameter. In this embodiment, the process method commences when touch pressure is applied to a geographical location image (i.e. a digital or electronic map) at a step 70. The digital or electronic map may comprise an image or motion-image at a particular pre-defined aspect of the map associated with the previously selected first taxi-start location parameter and/or associated with the desired second taxi-start location parameter. If the step 70 returns FALSE, the step 70 may reiterate a pre-determined number of times or until the step 70 returns TRUE. If the step 70 returns TRUE, the process method checks to determine if touch pressure has been released at a step 72. The detection of the presence of touch pressure may be performed with commonly known methods in the art and will not be discussed further here. If the step 72 returns FALSE, the step 72 may reiterate a pre-determined number of times or until the step 72 returns TRUE. If the step 72 returns TRUE, a step 74 is executed. At the step 74, the image or motion-image (i.e. the "map marker") from the aspect of the map associated with the first taxi-start location parameter is superimposed and stationed upon the aspect of the map associated with a centre of the previously applied touch pressure. The centre of the applied touch pressure is associated with the second taxi-start location parameter. In an alternative embodiment of the step 74, the image or motion-image at the aspect of the map associated with the first taxi-start location parameter may instead be "draggable" by initial touch pressure application to the aspect of the touch-screen displaying the image or motion-image associated with the first taxi-start location parameter, followed by a period of uninterrupted touch pressure that is non-stationary and may follow an arbitrary or pre-determined trajectory across the plane or plurality of planes of the touch-screen. The image or motion-image remains non-stationary for the duration of the non-stationary touch pressure until the touch pressure is released from the touch-screen. At the point-of-release of the touch pressure, the image or motion-image becomes stationary, and the aspect of the map upon which the image or motion-image becomes stationary is defined as the second taxi-start location parameter, as long as the distance between the first taxi-start location parameter and the second taxi-start location parameter is between and inclusive of 12 meters and 4502 meters. In most instances of this particular process method, if this distance parameter is not complied with—as calculated, for example, by the process method of FIG. 13—the image or motion-image may return to its previous stationary point or aspect (i.e. the first taxi-start location parameter). Subsequently, which may also be substantially simultaneously or in parallel, a determination is made of the map coordinates of the centre aspect of the previously applied touch pressure now superimposed with the image or motion-image map marker. Such determination may be made depending upon the particular geographical location identifiers utilized by the map. For example, the map may comprise a series of consecutive coordinates of increasing value positioned along the horizontal "x" axis, and a series of consecutive coordinates of increasing value positioned along the vertical "y" axis. If the geographical positional identifier coordinates are arranged in the format of "x, y", the geographical positional identifier coordinates of the second taxi-start location parameter may be, in a non-limiting example, "15, 22". In addition, it may be suitable for the geographical positional identifier coordinates of the second taxi-start location parameter to be interpretable by the intermediate aspect computer processes and/or the controller of the substantially autonomous vehicle in order to accurately ascertain the second taxi-start location parameter in real terms. In some cases, this may involve ensuring the positional identifier coordinates can be efficiently converted into a format recognizable by the intermediate aspect and/or the controller of the substantially autonomous vehicle. This conversion may be programmed to occur as an aspect of the execution of the first set of processor readable programmatic instructions, or as an aspect of the particular processor readable programmatic instructions executed by the computer systems of the intermediate aspect or may be programmed to occur as an aspect of the particular processor readable programmatic instructions executed by the controller of the substantially autonomous vehicle required to navigate to the second taxi-start location parameter, or some combination thereof. The updated map file and particular map coordinates associated with the image or motion-image that is the second taxi-start location parameter is subsequently stored in a memory unit at the step 78. In some embodiments, the steps 70, 72, 74, 76, and 78 may be executed through a plurality of times before the user achieves a second taxi-start location parameter that is congruent with the user's aims. The user has the flexibility to force the iteration of these steps through an arbitrary number of times, provided that the total time elapsed between the determined first taxi-start location parameter and the selection or inputting of the second taxi-start location parameter is between, and inclusive of, 6 and 5581.2 seconds.

Figure 15:
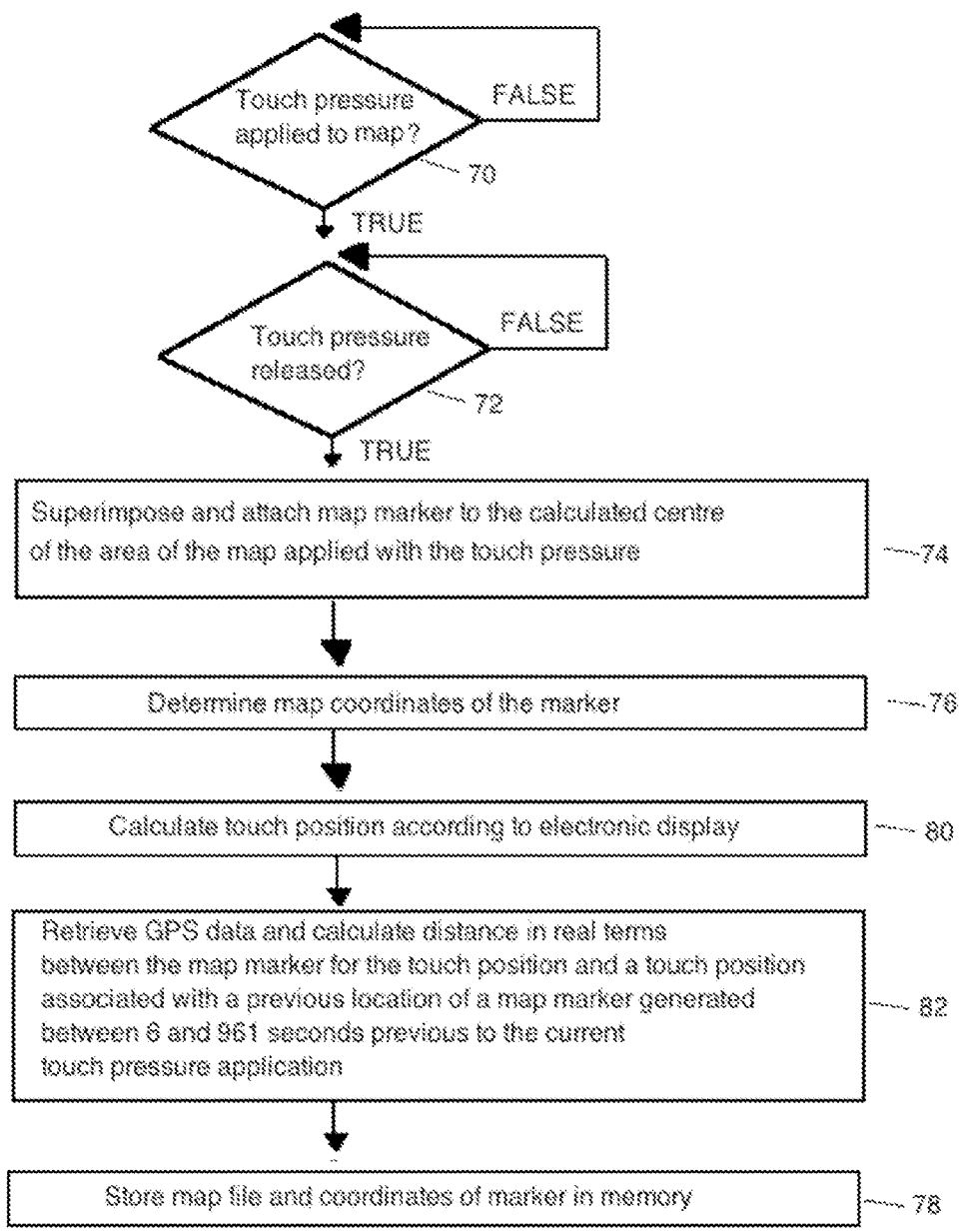
FIG. 15 shows an example embodiment process method of user-supplied input of the second taxi-start location parameter.

FIG. 15 depicts an example embodiment process method of user-supplied input of the second taxi-start location parameter that shares several of the same steps as the example embodiment process method of FIG. 14. Specifically, steps 70, 72, 74 and 76 are executed in accordance with the embodiment presented in FIG. 13. However, in this example embodiment, a step 80 is executed after the step 76. At the step 80, a calculation of the touch pressure position is made according to the dimensions of the electronics display comprising the user-interface device. This may involve determining the distance between the touch pressure position (in some instances, the centre aspect of the touch pressure position) associated with the second taxi-start location parameter and a previously inputted and recorded touch pressure position (in some instances, the centre aspect of the touch pressure position) associated with the first taxi-start location parameter, wherein the distance calculation is within the arbitrary and limited measurement parameters of the particular electronics display integrated with the mobile communications device and hence may not be related to real distance terms. In a non-limiting example, the distance between the two touch pressure positions may be 31 millimeters according to the dimensions of the map and the dimensions of the electronics display. Alternatively, the calculation of the two touch pressure positions may involve using the measurement scales applied by the map. In another non-limiting example, the distance between the two touch pressure positions may be 4.5 "map units", which may convert to a real-terms distance of 90 meters (i.e. 20 meters per "map unit"). To assist in ensuring the overall accuracy of distance determinations, GPS data is retrieved in a step 82 in order to calculate the distance in real terms between the two pre-determined touch pressure positions corresponding with the two respective taxi-start location parameters. GPS data may be retrieved from a memory cache associated with the electronic map, or may be retrieved by querying one or more GPS satellites, or may be retrieved via an appropriate geographical information source located on a computer sever external to the mobile communications device (e.g. located on the wide area network and accessible via wired or wireless communications, or some combination thereof). The computer server could be, for example, associated with the intermediate aspect. An accurate calculation or determination of the real-term distance between the two touch pressure positions will greatly assist in ensuring the overall efficiency of the substantially autonomous vehicle taxi-service. GPS data may also be utilized to ensure the accuracy of the geographical positional identifiers of the second taxi-start location parameter. For the calculations performed to remain extant and utilizable, the two touch pressure positions must have a time difference in their determinations of between 6 and 5581.2 seconds. If successful, the step 78 is performed storing the map coordinates and associated distance parameters in an appropriate memory unit for future retrieval. In some embodiments, the steps 70 and 72 may be replaced with a textual, motion-based, or audio input system, via which the user may input the physical address, name, or appropriate map coordinates of or correlating with the second taxi-start location parameter.

Figure 16:
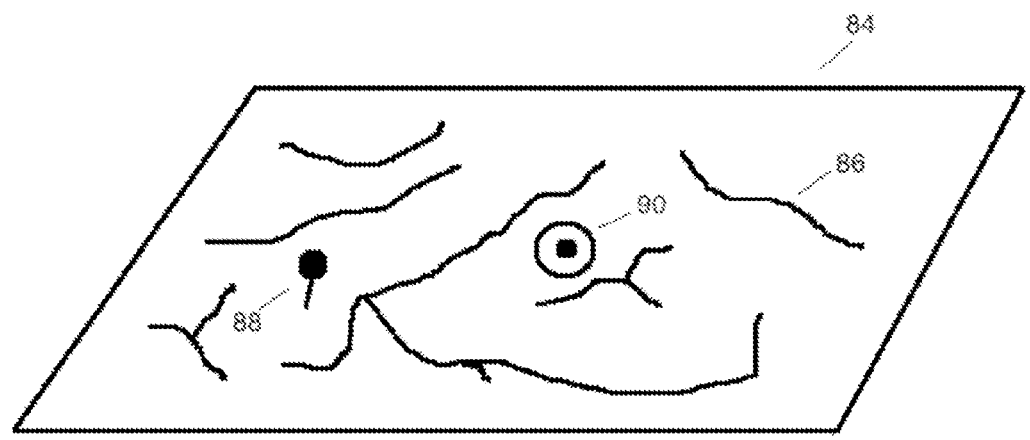
FIG. 16 shows a map display, in accordance with aspects of the present disclosure.

FIG. 16 illustrates the map display, an aspect of which an image or motion-image positional marker can be superimposed upon in response to touch pressure application to indicate a desired taxi-start location parameter and record appropriate geographical locational measurements thereof. A map display 84 presenting a limited area of a total geographical area is presented. The limited area comprising a portion of a total geographical area is processed by the mobile communications unit processor and displayed as the map display 84 on the user-interactive interface, which in this non-limiting case, is an electronics display. The map display 84 identifies particular map terrain such as at 86 which may be representative of any number of common map display elements such as a river or other water-collector element, an aspect of the land that is positioned at a higher altitude compared to the surrounding terrain, a particular landmark location, a major road, a cluster of buildings, and the like. In this particular non-limiting map display 84, an icon-based or image-based geographical positional identifier marker 88 is superimposed upon an aspect of the map indicating a pre-determined user selected first taxi-start location parameter. A touch pressure application has been registered at an aspect of the map 90. At 90, a shaded aspect in the centre of the circular touch position area indicates the aspect of the map display 84 upon which a geographical positional marker will be superimposed upon to indicate the second taxi-start location parameter. Note, that all aspects of 90 may, in most embodiments, not be visible to the user of the mobile communications device. In this embodiment, 90 is displayed to assist in the description of the present disclosure. As discussed previously, the map display 84 is operable to calculate and display distance and locational information via relevant measurements of the distance in map units, alternatives thereof, and/or real terms between the respective touch pressure points. Distance and locational information may be displayed as text or image-based or motion-image-based text superimposed upon an aspect of the map display 84, or adjacent to the map display 84. Distance and locational information may also be displayed along one or more axes parallel to the map display 84.

Figure 17:
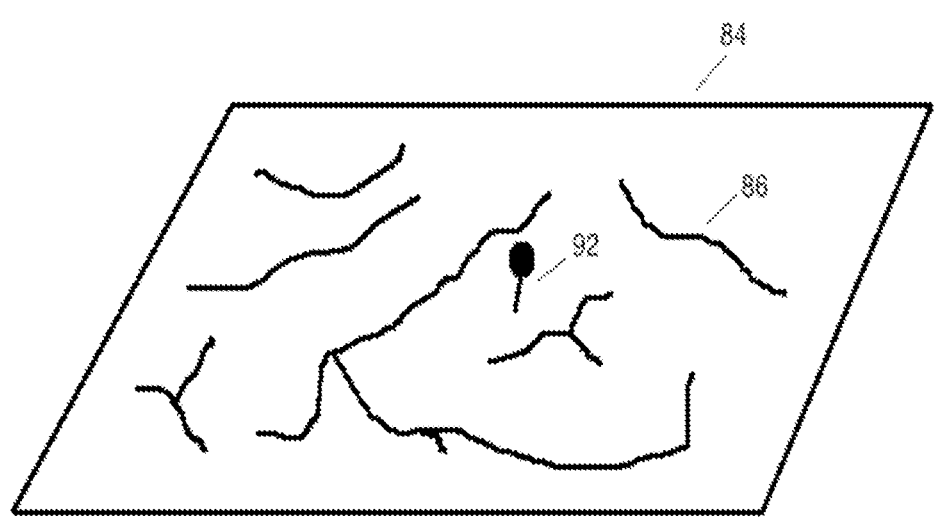
FIG. 17 shows a map display, in accordance with aspects of the present disclosure.

FIG. 17 illustrates the map display 84 wherein all relative distance calculations between the two touch pressure points represented by 88 and 90, respectively, have returned results compliant with the required limitations as set-forth and described by embodiments of the present disclosure. Hence, the icon-based or image-based (or in some instances motion-image-based) geographical positional marker 88 is now an icon-based or image-based or motion-image-based geographical positional marker 92 superimposed upon the previously determined touch pressure application 90 indicative of the desired second taxi-start location parameter. This map display 84 with positional marker 92 is subsequently captured and stored in an appropriate memory unit; appropriate map coordinates or identifiers associated with the area superimposed on by marker 90 are subsequently, substantially simultaneously or simultaneously transmitted via a wireless communications channel in a readable form to the intermediate aspect and/or an appropriate substantially autonomous vehicle controller.

Figure 18:
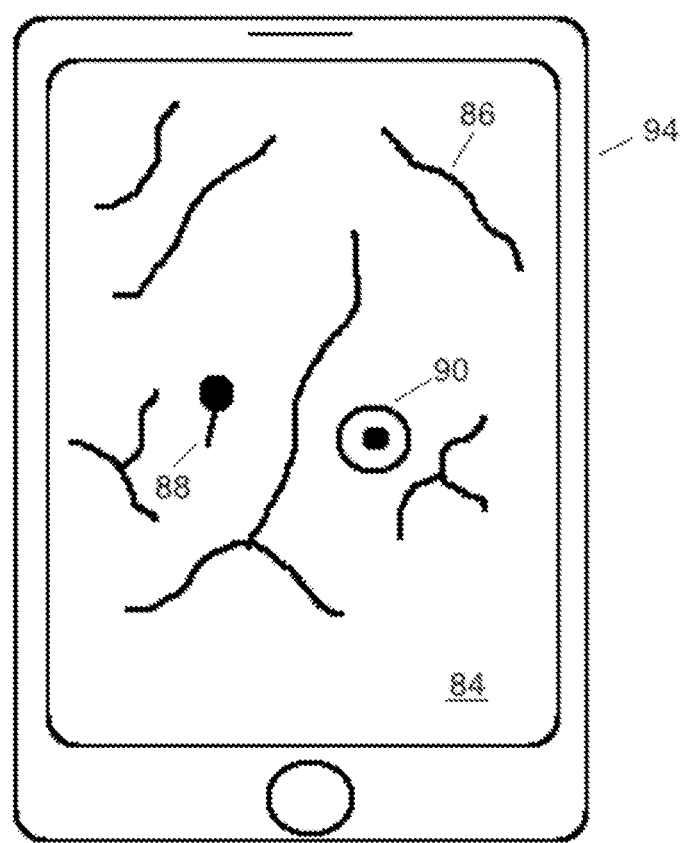
FIG. 18 shows a map display embodiment as depicted on an example mobile communications device, in accordance with aspects of the present disclosure.
Figure 19:
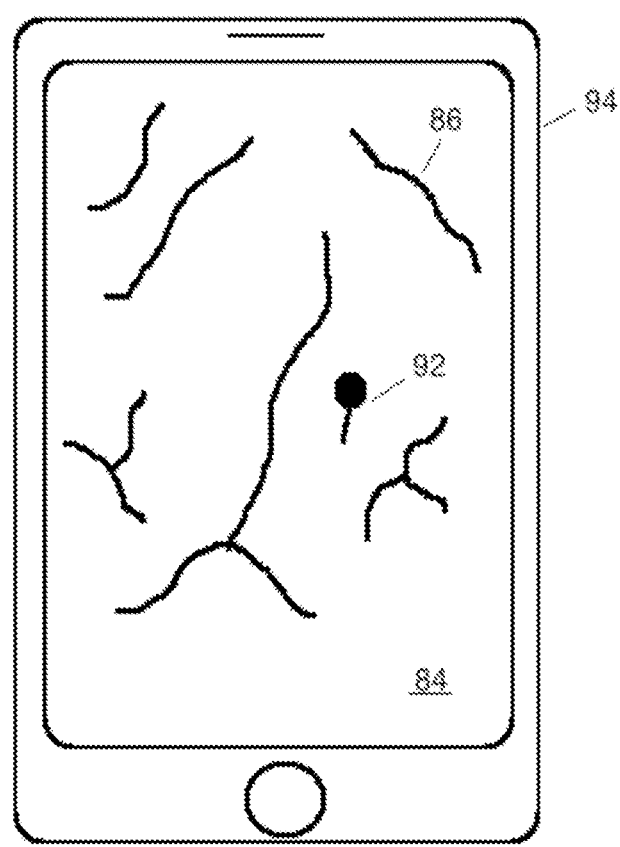
FIG. 19 shows a map display embodiment as depicted on an example mobile communications device, in accordance with aspects of the present disclosure.

FIGS. 18 and 19 illustrate the map display 84 according to the respective depictions of FIGS. 16 and 17 within the confines of the mobile communications device's electronics display user-interface. FIG. 18 illustrates the map display 84 as depicted on the electronics display of a mobile communications device 94. All previously described elements: 86, 88, and 90 are depicted as they may be depicted on an electronics display of the mobile communications device 94, with the exception of 90 as discussed previously. The mobile communications device 94 may be a smartphone, a mobile phone, a pager, a PDA, a Blackberry, tablets, or any other smart electronics device with an appropriate electronics display, as described elsewhere in this disclosure. Within the spirit and scope of this disclosure, mobile communications device 94 may alternatively be a plurality of interlinked or interconnected, via one or more wired or wireless communications protocols, smartphones, mobile phones, pagers, PDAs, Blackberries, tablets, or any other smart electronics device with an appropriate electronics display, or some relevant combination thereof. Alternatively, mobile communications device 94 may be a device capable of a 3D display, an augmented reality display, a holographic display, a virtual reality display, and the like, as those with ordinary skill in the art will readily recognize. Alternatively, mobile communications device 94 may be a computer system such as a PC or computer server. Ordinarily, or until innovative advances of a commercial form indicate otherwise, the electronics display may be an LCD touch screen, some derivative or substitute thereof, or another touch-based electronics display screen capable of high-definition image renders as commonly understood by one with ordinary skill in the art.

FIG. 19 illustrates the map display 84 as depicted on the electronics display of the mobile communications device 94. All previously described elements: 86 and 92 are depicted as they may be depicted on an electronics display of the mobile communications device 94. Not shown are any textual, motion-image-based, audio-based, or image-based positional measurements, dimensions, or axes. However, one with skill in the art will readily recognize that such positional measurements, dimensions, or axes can be readily displayed by superposition upon the map display 84, adjacent to map display 84, or parallel to map display 84.

Figure 20:
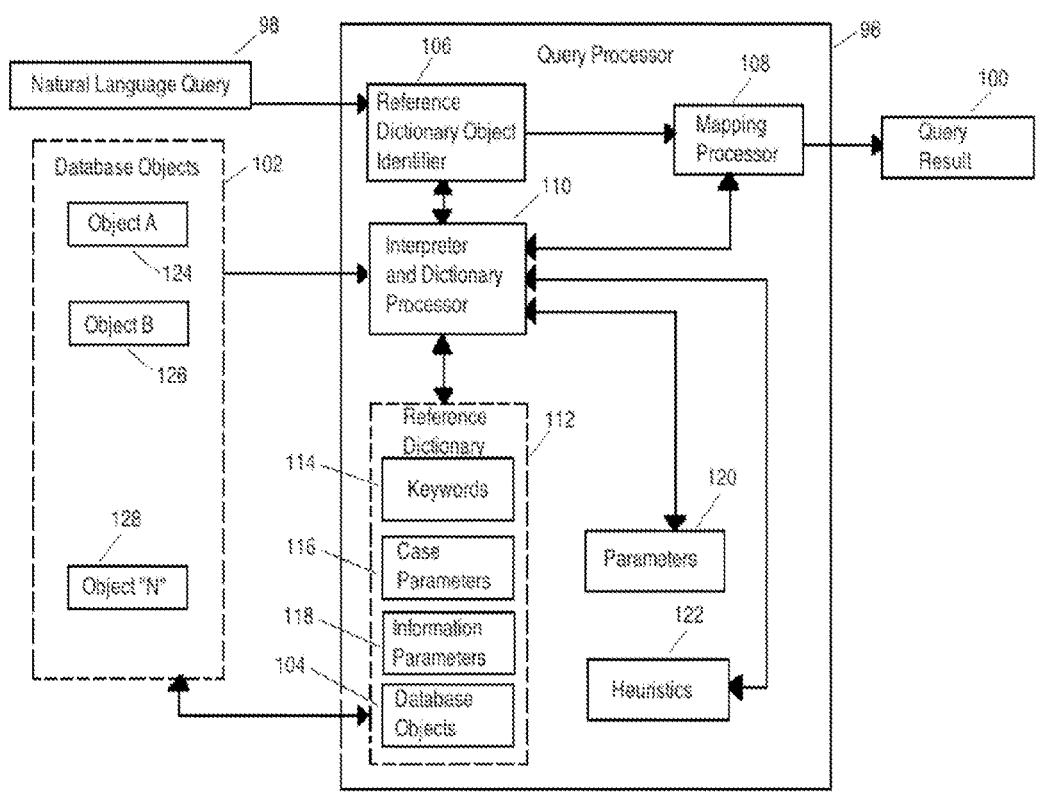
FIG. 20 shows an example embodiment of a system capable of determining a user of the first set of processor readable programmatic instructions' desired second taxi-start location parameter by taking advantage of a natural language converter.

FIG. 20 illustrates an example embodiment of a system capable of determining a user of the first set of processor readable programmatic instructions' desired second taxi-start location parameter by taking advantage of a natural language converter. The natural language converter may comprise a speech-to-text conversion module, which converts electrical signals generated as a direct result of a recorded speech pattern into a text or image or motion-image format recognizable by the first set of processor readable programmatic instructions and/or the intermediate aspect and/or an appropriate substantially autonomous vehicle controller. The speech-to-text conversion module may convert the inputted audio data into basic language units and then into words. Optionally, the conversion module may perform a contextual analysis to ensure that the words are spelled correctly and are linked in grammatically correct ways. The conversion module may utilize a speech-to-text conversion algorithm that, for example, converts continuous speech into text or segments the analogue or digital audio data into segments (e.g., individual words, syllables, sounds, by pauses, etc.) to ensure that each word is properly converted into text. In FIG. 20 a natural language query or converter processor 96 is depicted according to an embodiment of the user-interactive interface. The processor 96 receives a natural language query 98 and a plurality of database objects 102, and produces a query result 100. The natural language query may be, for example, a paragraph, a sentence, sentence fragment, a plurality of numbers, a single word, a single number, a plurality of keywords, or some combination thereof. The natural language query may, in sum, in concatenation, or in combination, comprise a physical address, such as a home address, or a commercial building address, a landmark, a series of map or GPS coordinates, a partial physical address, a partial home address, a partial commercial building address, the name of a person, or some combination thereof. The natural language query is preferably mapped to, or associated with, a second taxi-start location parameter user-inputted to override a first taxi-start location parameter, and adapted to be transmitted, indirectly or directly, to the controller of an appropriate substantially autonomous vehicle. The query result 100 may be any information that is relevant to the combination of database objects 102 and query 98. According to this particular, non-limiting embodiment of the user-interactive interface, the natural language query 98 is mapped to the plurality of database 102 using a reference dictionary 112 comprising keywords 114, case parameters 116, information parameters 118, and database objects 104. The query processor 96 includes a reference dictionary object identifier 106 that parses query 98 and generates one or more objects recognized in the reference dictionary 112. Reference dictionary object identifier 106 also identifies words, including numbers, that are meaningful in the reference dictionary 112 and eliminates useless or meaningless words and/or numbers. Processor 96 also accepts and processes a number of database objects 104. As described, processor 96 may have an associated reference dictionary 112 that includes keywords 114, case parameters 116, information parameters 118, and database objects 104. Keywords 114 may be, for example, a set of keywords and their combinations generated from the plurality of database objects 104, which includes one or more objects 124, 126, 128. Keywords 114 may also be learned from a user through performing queries, or may be provided through a separate administration interface associated with processor 96. Processor 96 also includes an interpreter and dictionary processor 110 operable to receive objects identified by the reference dictionary object identifier 106 and further determines an optimal interpretation of the received objects. More specifically, processor 110 determines optimal interpretations of the received objects, resolves ambiguities, updates information parameters 118, and interacts with users, in some cases, to facilitate learning. Processor 110 utilizes parameters 120 and heuristics 122 to resolve ambiguities in determining the optimal interpretation of query 98. Parameters 120 and heuristics 122 may relate to information parameters 118, which are in turn related to keywords 114, case parameters 116, and database objects 104 in a semantic manner. When there are ambiguities in the interpretation of objects, e.g. multiple possible interpretations, multiple permissible combinations of meaningful objects, etc., parameters 120 and heuristics 122 related to these objects are used to reduce or resolve these ambiguities. A mapping processor 108 performs a mapping between incoming objects and database objects 102. In particular, processor 108 may generate database queries from the objects and the interpretations provided by identifier 106 and processor 110, respectively. Processor 108 may, for example, generate SQL queries used to locate database objects 102. These queries may be executed by an SQL search engine, and processor 96 may provide query result 100 to user through a user-interactive interface such as an electronics display. Establishing a complete set of keywords is a key factor in handling ambiguity. However, additional information beyond keywords may be used to determine the meaning of an input query. This additional information makes it possible to use a relatively small collection of keywords. Particularly, there are four layers of resources comprising a data dictionary that are used to relate an incoming query 98 to database object 102; i.e. case parameters 116, keywords 114, information parameters 118, and database object values 104. These resources may be integrated through an extensible metadata representation method so that every piece of resources references to all other related resources in a semantically-based graphic. For instance, a keyword 114 points to the semantic subject(s) it refers to, which points in turn to entities, relationships, and items pertaining to the subject(s), and ultimately to database object values 104. The keywords 114 also connect to case parameters 116 involving them. The core of the reference dictionary (information model, initial keywords, and database structure) may be, for example, a design-time product developed by the analysts, designers, and users. Cases and additional keywords, metadata (e.g. changes to the information parameters) and database values may be added during operation of the system, and thus the system evolves. A learning mechanism allows richer keywords and cases to provide more accurate performance. The reference dictionary 112 enables the processor of the mobile communications device to recognize a feasible region of interpretations of the input query 98 and evaluate them. The reference dictionary 112 also serves as the basis for interaction with the user (identifying needs and generating meaningful reference points) and acquisition of lessons (determining additional keywords and cases). A reference dictionary has four fundamental attributes: the reference dictionary generates search-ready graphics-based representation of all four layers of resources; supports learning; simplifies keywords, and assures complete interpretations of natural queries. Regarding the last two points, the inclusion of information parameters 118 and case parameters 116 reduces the volume of keywords 114 needed to reduce the first two sources of ambiguity as those with skill in the art will readily understand. To sum up, when an audio input is recognized via, for example, a suitable microphone or audio-input device, the appropriate voice recognition module may perform simple language pattern matching wherein each spoken word is recognized in its entirety; language pattern and feature analysis (where each word is compartmentalized into bits and recognized from key features—e.g. the vowels it contains); language modeling and statistical analysis in which a database of grammar and the relative probabilities of certain words or sounds following on from one another is accessed and utilized to speed up recognition and improve accuracy; artificial neural networks capable of "learning" speech patterns and natural language, or some combination thereof. Upon successful recognition and conversion of audio data input into machine recognizable language, and wherein the audio input data consists of the second taxi-start location parameter, the first set of processor readable programmatic instructions may execute any embodiment, or a derivative or substitute, of the present disclosure as the particular application requires.

Figure 21:
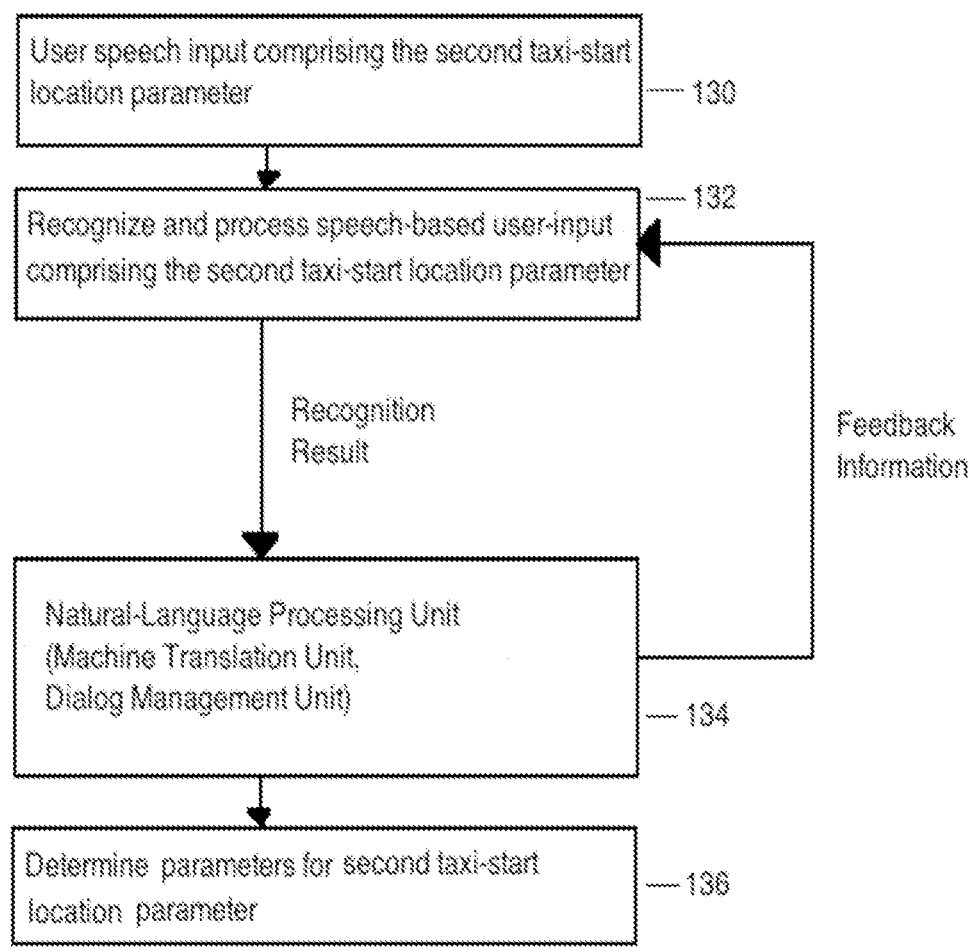
FIG. 21 shows an example embodiment of a speech or audio input process method for the purposes of determining a second taxi-start location parameter.

FIG. 21 illustrates an example embodiment of a speech or audio input process method for the purposes of determining a second taxi-start location parameter. In this speech processing system, speech or audio is user-inputted and a translation or conversion of the speech or audio into machine-readable units is also outputted via aspects of the user-interface device. Additionally, the speech or audio input may be translated from a first natural language into a second natural language in order to assist the conversion of the speech or audio into machine-readable units. In a non-limiting example, the speech or audio input may be French, which may be subsequently translated into English. User speech or audio input comprising the second taxi-start location parameter is inputted at a step 130. At the step 130, user input may comprise additional speech or audio incongruent with, or otherwise differentiated from, the second taxi-start location parameter, as the application requires. At a step 132, the inputted speech or audio is converted into a plurality of electrical signals, which are recognized at the step 132 to comprise the second taxi-start location parameter. The plurality of electrical signals are then processed at a step 134 by a natural language processing unit comprising a machine translation unit and a dialog management unit. The machine translation unit translates the speech or audio input into machine-readable units—for example, readable by one or more of the process methods of the first set of processor readable programmatic instructions—and the dialog management units assists in reconstructing and identifying the speech or audio input. The speech or audio conversion techniques utilized by the natural language processing unit may be any suitable technique, or a derivative or substitute, identified in connection with the description of FIG. 20. Furthermore, the results of the conversions and identifications returned at the step 134 may be subsequently fed back to the logical process at the step 132 in order to, for example, assist the process method at the step 132 in more accurately identifying speech or audio input, especially with regards to a taxi-start location parameter. The results returned at the step 134 are subsequently utilized by a step 136 to accurately determine the second taxi-start location parameter. The step 136 preferably involves one or more embodiments, or a derivative or substitute, described in this disclosure. Those with ordinary skill in the art will recognize that in some derivative embodiments, the feedback of information at the step 134 to the step 132 may not be resourceful or necessary or only be of peripheral applicability.

Figure 22:
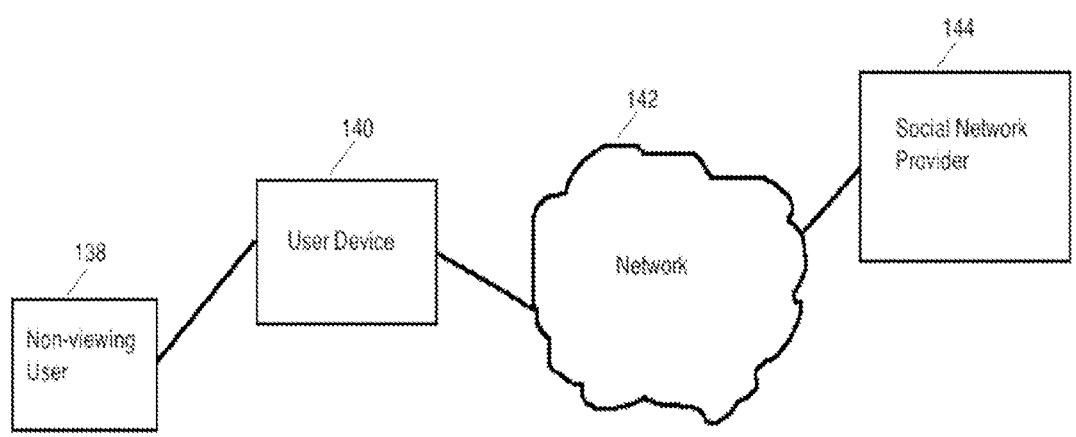
FIG. 22 shows an exemplary environment for generating a news feed in a social network environment in connection with the execution of the second set of processor readable programmatic instructions.

Turning now to FIG. 22, an illustration of an exemplary environment for generating a news feed in a social network environment in connection with the execution of the second set of processor readable programmatic instructions is shown. Specifically, the news feed is generated during the time-frame in which the first set of processor readable programmatic instructions is actively determining a second taxi-start location parameter. Hence, in keeping with the aims of the present disclosure, a non-viewing user of a generated news feed of a social network environment is presented at 138 in connection with a user-device 140, which is in this case a mobile communications unit facilitating the execution of the first set of processor readable programmatic instructions and the second set of processor readable programmatic instructions. User-device 140 is coupled to a social network provider 144 via a network 142. The network 142 may be a combination of computer servers, network gateways, and wired and wireless communications networks such as Ethernet, fibre-optic, DSL, twisted cable, copper, IEEE 802.11, WiMAX, Bluetooth, cellular communications, satellite communications, combinations thereof, and the like, as those with ordinary skill in the art will readily recognize. The social network provider 144 may comprise any user or entity that provides social networking services, communication services, dating services, commercial products or services, company intranets, and so forth. For example, the social network provider 144 may host a website that allows one or more users, including the user of user-device 140, to communicate with one another via text, images, videos, motion-media, 3D media, and combinations thereof, via the network 144—except with restrictions and limitations for any one or more of the users, wherein the first set of processor readable programmatic instructions is determining and/or confirming a second taxi-start location parameter for any one or more of the respective users. The social networking website offers the user of user-device 140 an opportunity to connect or reconnect with one or more other users who may be friends from school or university, work colleagues, associates, celebrities, strangers, potential partners, acquaintances, family members, combinations thereof, and the like. In some instances, a social network environment may include a segmented community. A segmented community, in some instances, is a separate, exclusive or semi-exclusive Internet-based social network wherein each authenticated segmented community member accesses and interacts with other members of their respective segmented community.

Figure 23:
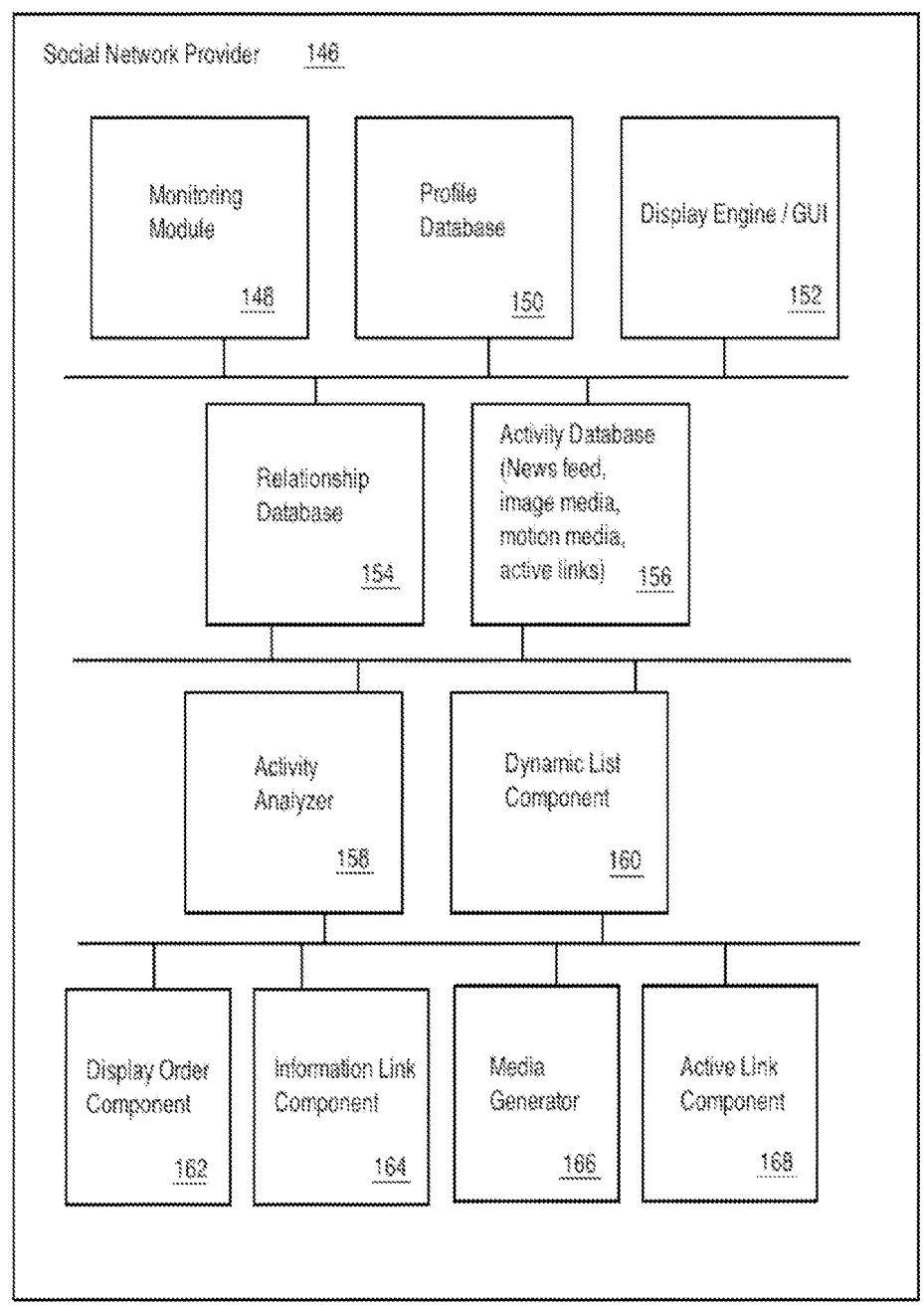
FIG. 23 shows a block diagram of a typical social network provider in accordance with aspects of the present disclosure.

Referring now to FIG. 23, a block diagram of a typical social network provider, such as the social network provider 144, is shown. A profile database 150 is provided for storing data associated with each of the users, such as the non-viewing, but authenticated, user 138 associated with user-device 140. When the non-viewing user 138 previously subscribed to services provided by the social network provider 144, a user profile was generated, constructed, or designed for non-viewing user 138. For example, the non-viewing user 138 may have pre-determinedly selected privacy settings, provided contact information, provided personal statistics, specified memberships in various organizations, indicated interests, listed affiliations, posted class schedules, detailed work activities or grouped other users according to one or more categories. When the non-viewing user 138 adds additional information to the user profile, at least subsequent to the processing of the second taxi-start location parameter, such as adding additional contacts or affiliate users, the user profile in the profile database 150 may be updated with the information added. The user profile may be stored, modified, added, and so forth to any appropriate storage medium. A timestamp may be associated with the user profile. Examples of timestamp include order of occurrence in a database, date, time of day, and the like. In some instances, the user profile is created outside of the social network environment and provided to or accessed by the social network provider 144. In other instances, the profile database 150 may be located remotely and accessed by the social network provider 144 via a communications interface (not shown). The social network provider 144 includes a communications interface (not shown) for communicating with users and the non-viewing user 138, such as via the user-device 140, over the network 142. The user-device 140 (i.e. facilitated by the second set of processor readable programmatic instructions at an instance in time) communicates various types of information, such as privacy settings selections, groupings of other users, and so forth, to the social network provider 144 via the communications interface (not shown). Any type of communications interface may be suitable as the application requires, as recognized by one with ordinary skill in the art. A monitoring module 148 tracks one or more user activities on the social media network. For example, the monitoring module 148 can track user interaction with one or more items of media content, such as text and/or image and/or multimedia and/or motion-image or video and/or 3D content and/or some combination thereof based news stories, product or service updates, other users' profiles, communication to other users, chat rooms provided via the social network provider 144, and the like. Any type of user activity can be tracked or monitored via the monitoring module 148. The information, people, groups, products and services, stories, and the like, with which the non-viewing user 138 has access to, may be represented by one or more objects, such as text, images, motion media, multimedia, 3D content, augmented reality content, virtual reality content, holographic content, hyperlinks, active links, and combinations thereof. The monitoring module 148 may determine an affinity of the non-viewing user 138 for subjects, other users, relationships, events, organizations, and the like according to users' activities. A display engine/GUI 152 may also be provided by the social network provider 144. The display engine/GUI 152 displays the one or more items of media content, profile information, and so forth to users. Users can interact with the social network provider 144 via the display engine/GUI 152. For example, users can select privacy settings, access their own user profile, access other users information available via the social network provider 144, and the like, via the display engine/GUI 152. A mini-feed comprising a user's selected or desired viewing parameters may be displayed in an aspect in the display engine/GUI 152. Display engine/ GUI may further include or be capable of, in addition to usual 2D renders: 3D renders, holographic display, augmented reality displays, virtual reality displays, and the like. A relationship database 154 is provided for storing relationship data about each user. In some instances, prior to the non-viewing user 138 becoming a non-viewing user of the social network provider 144 due to the determining and/or processing of the second taxi-start location parameter, or after the determining and/or processing of the second taxi-start location parameter has occurred thereof, the user can specify relationships with one or more subject users of the social network via the user profile, or by any other means. Further, the viewing user can assign categories, groups, networks, and so forth to the one or more subject users with which the viewing user has a relationship. The relationship, for example, may specify that the subject user is a family member, a schoolmate, an ex-girlfriend, a work colleague, and so forth. Any type of relationship may be specified. An activity database 156 is provided for storing activity data about each user. The activities may be tracked by the monitoring module 148. Activities monitored by the monitoring module 148 may be stored in the activity database 156. Activity entries in the activity database 156 may include a timestamp indicating time and date of the activity, the type of activity, the particular user initiating the activity, any other users who are objects of the activity, and the like. Activities may be stored in multiple databases, including the activity database, the profile database, the relationship database, and the like. In some instances, the social network provider 144 may determine a relationship for the user. For example, if the non-viewing user 138 previously established communications with another user interested in playing tennis, the social network provider 144 may assign the relationship of fellow tennis player. The social network provider 144 may inquire, in one instance, whether or not each of the users wants to add the other user as a fellow tennis player. In some instances The social network provider 144 may utilize a common interest in playing tennis as a variable to measure the user affinity for tennis and/or the fellow tennis player without inquiring whether each of the users wants to add the other user to their user profile. A relationship may be assigned based on a user's previous interaction with other users or with any type of content. The non-viewing user 138 may have more than one relationship with other users or with content, in some instances. In some instances, one or more networks may be provided for the non-viewing user 138 and other users. For example, non-viewing user 138 may have a network comprised of users grouped according to a university attended, a network comprised of people grouped according to the user's geographical location of residence, a network comprised of people grouped according to a common field of work and/or interest, a network comprised of people grouped according to a particular business, a network comprised of people grouped according to a particular product and/or service, and the like. A common network may establish a relationship between at least two users in the common network, in some instances. Any type of network may be provided by the social network provider 144. A network may comprise people grouped according to any type of category, such as various social networks, like "friends", "geographical adjacency", and the like. The non-viewing user 138 may have pre-determinedly specified the networks, categories, sub-categories, and so forth and/or the networks, categories, and sub-categories may be pre-determined by the social network provider 144. An activity analyzer 158 accesses the one or more user activities detected by the monitoring module 148 and analyzes the one or more user activities to compile a mini-feed activity list of activities associated with the user, for example, the non-viewing user 138. Optionally, the activity analyzer 158 may access the one or more activities from the various databases (e.g. the profile database 150, the relationship database 154, the activity database 156, and so on). The activities may include activities previously performed by the non-viewing user 138, e.g. add an affiliation to a group, terminate an affiliation with a group, add information to the profile, remove information from the profile, RSVP to an event, add a photo to own photo album, create a photo album, approve a relationship request, and the like. The activities may include activities performed by other users relating to the subject non-viewing user 138, e.g., the subject non-viewing user 138 is (1) mentioned by another user in the other user's activities; (2) approved by another user for a relationship; (3) is tagged by another user in their photo or photo album, and the like. Optionally, the subject non-viewing user's activities may be stored in a user activity storage medium (not shown) accessible by the social network provider 144. A dynamic list component 160 is configured to limit the number of news items displayed. In some embodiments the dynamic list component 160 selects current activities, e.g., the most recent plurality of activities according to the timestamp, for display as news items. In some instances, the dynamic list component 160 selects activities according to user priorities, viewing user preferences, filters, and the like. For example, the non-viewing user 138 may have pre-determinedly set a filter for the dynamic list component 160 to show only relationship activities of another user or users in the news items display, or to show only a certain type of image, such as by a certain user, or group of users, and the like. In some instances, the dynamic list component 160 may maintain a news feed for each user comprising a list of a pre-determined number of news items (e.g. 55 entries) about the user. The dynamic list component 160 may place the most recent news item at the top of the list and remove the oldest news item from the bottom of the list for each new activity. News items may be added and removed according to the preferences of, for example, the non-viewing user 138, as described previously. A display order component 162 is adapted to determine an order for the display of the news items. In some instances, the list of news items may be sorted according to a timestamp associated with the respective activities. In some instances, the list of news items may be sorted according to a viewing user priority and parameters, alphabetical order of a field or parameter within the news item display, etc. In some instances, multiple field or parameter sorts may be applied to the news item display. For example, the non-viewing user 138 may have previously configured his or her preferences to display photo activities first followed by event activities second, etc., and to display the photo activities and then the event activities in a chronological order. An informational link component 164 is configured to provide a user, such as the non-viewing user 138, with one or more informational links to an activity of another user. The informational links may provide the user additional information about the activity that is the subject of the news item. For example, an informational link may enable the non-viewing user 138 to view a photo added to another user's photo album when the non-viewing user 138 becomes a viewing user at a point in time subsequent to the determining, registering and processing of the second taxi-start location parameter, and the like. An active link component 168 is configured to provide the non-viewing user 138 one or more active links to an activity of another user. The active links may enable the non-viewing user 138 to participate in the activity that is the subject of the news item when the non-viewing user 138 becomes a viewing user at a point in time subsequent to the determining and processing of the second taxi-start location parameter. For example, an active link may enable the non-viewing user 138 to, after becoming a viewing user, download a photo added to another user's photo album, and the like. In some instances, the active link and the informational link may enable the non-viewing user 138 to perform the same function at point in time that the non-viewing user 138 becomes a viewing user. A media generator 166 is adapted to format the activity list formulated by the activity analyzer 158 and display one or more news items according to the dynamic list component 160, and the display order component 162. The media generator 166 is further adapted to provide functionality to any links attached by the informational link component 164 and/or the active link component 168. In some instances, the media generator 166 provides the display of the news items to the display engine/GUI 152 for display to the non-viewing user 138 at a point in time a change is made from a non-viewing user to a viewing user after the determining, registering and processing of the second taxi-start location parameter. The display of the news items may be via a user-interface device via user-device 140.

The non-viewing user 138 is defined as a user restricted from one or more aspects of viewing a social media network in accordance with one or more aspects of the present disclosure.

Figure 24:
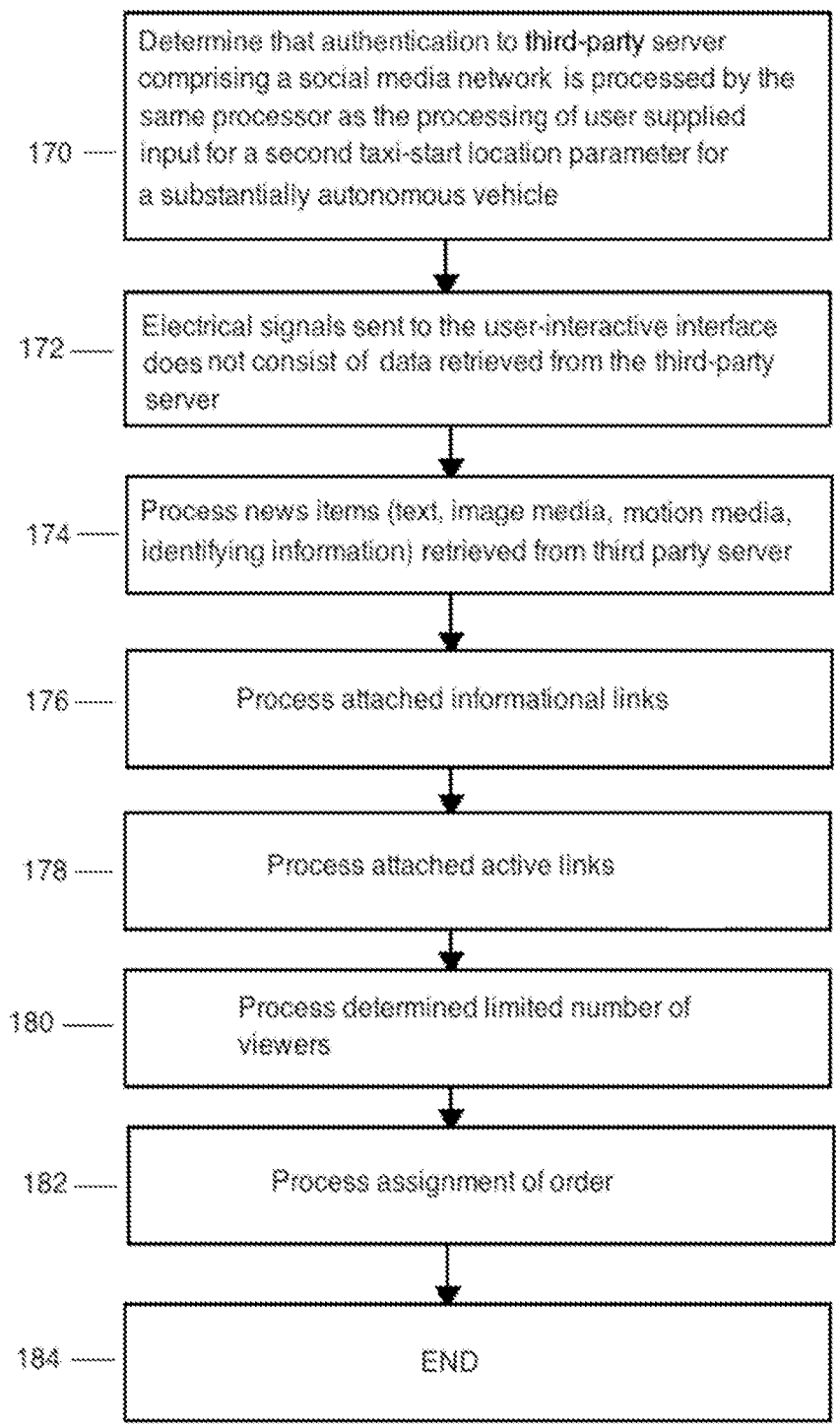
FIG. 24 shows a process method for assigning and processing news items retrieved from a social network provider in accordance with aspects of the present disclosure.

Turning now to FIG. 24 a process method for assigning and processing news items retrieved from a social network provider 144 is illustrated. At a step 170, a determination step is made to determine that the authentication of the second set of processor readable programmatic instructions to the third party server comprising the social media network (i.e. the social network provider 144) is processed by the same processor as the processing of the first set of processor readable programmatic instructions for user supplied input comprising a second taxi-start location parameter for a substantially autonomous vehicle. As described previously, the authentication of the second set of processor readable programmatic instructions to the third party server is via a secure communications channel such as SSL, or improvements or substitutes thereof. The authentication of the second set of processor readable programmatic instructions to the social network provider 144 means that the second set of processor readable programmatic instructions is able to retrieve an assigned order of news items from the social network provider 144. The processor that is determined to process both the first set of processor readable programmatic instructions and the second set of processor readable programmatic instructions may be a software and/or hardware processor, controller, microcontroller, microprocessor, CPU, and the like, and may comprise one or more sub-processors. This step may be performed through various feedback processes, error detection processes, and/or memory count processes, and the like. At a step 172 a determining step is made to determine that a plurality of electrical signals generated and sent to the user-interactive interface does not consist of data retrieved from the third party server (i.e. the social network provider 144) beyond set limitations or restrictions in accordance with one or more aspects of the present disclosure. This step may be performed through various feedback processes, error detection processes, processing of the instructions from the first set of processor readable programmatic instructions and the second set of processor readable programmatic instructions, and/or memory count processes, processor energy usage, and the like. The steps 170 and 172 may be, in some instances, performed in parallel, simultaneously, or substantially simultaneously. At a step 174 news items relating to activities performed by a subject user associated with a social network environment (i.e. 144) are processed by processor and/or the second set of processor readable programmatic instructions. For example, prior to processing by the processor and/or the second set of processor readable programmatic instructions, the activity analyzer 158 may collect a list of one or more activities associated with the subject user from monitoring module 148 and optionally from the various databases in the social network (e.g., the profile database 150, the relationship database 154, etc.). The list of activities may include viewing of user profiles, viewing of users' photos, sending messages to other users, and so on, as discussed previously. The list of activities may be filtered according to preferences previously set by the non-viewing user 138 and/or the subject user. At a step 176, informational links that may be attached to one or more news items from the step 174 are processed by processor and/or the second set of processor readable programmatic instructions. For example, prior to processing by the processor, the informational link component 164 may have determined relevant links relating to activities to attach to one or more of the news items, for example, an informational link to the website of a promotional based photo attached to the vicinity of the promotional based photo. At a step 178 active links that may be attached to one or more news items from the step 174 are processed by processor and/or the second set of processor readable programmatic instructions. For example, prior to processing by the processor, the active link component 168 may have determined relevant active links relating to activities to attach to one or more of the news items, for example, returning to the promotional photo example of the previous step, a drop-down menu providing a selection from a list of actions including, for example, a download link to the promotional photo, an invitation to join the list of friends of the subject user account displaying the promotional photo, and a link to join an event associated with the promotional photo. At a step 180 a limited number of users who may view a news feed or mini-news feed is processed by processor and/or the second set of processor readable programmatic instructions. For example, prior to processing by the processor, a privacy component (not shown) may limit display of the news feed or mini-news feed to only users of the social network. In some instances, a privacy parameter stored in the profile database 150 may limit display of selected news items for the non-viewing user 138 at a point in time at which the non-viewing user 138 becomes a viewing user without the restrictions described throughout the present disclosure and/or other relevant or subject users. At a step 182, an assigned order to the news items is processed by processor and/or the second set of processor readable programmatic instructions. For example, prior to processing by the processor, the display order component 162 may have assigned the order of the news items according to a priority set by the non-viewing user 138 (e.g. profile preferences, and the like) and/or a priority set by a subject user (e.g. profile preferences, and the like). The assigned order of news items may be via chronological order, may be via interests and hobbies or other chosen parameters, may prioritize the activities of some subject users over other subject users, and the like. The process method ends at a step 184. At a future point in time after the determining, registering and processing of the second taxi-start location parameter by the second set of processor readable programmatic instructions, the assigned order of news items may become significantly viewable or perceptible to the user of the mobile communications device—without the restrictions and limitations described in the present disclosure—i.e. via user control or design or automation. In the process method, one or more of the steps may be performed simultaneously, substantially simultaneously, or in parallel, as the application requires and/or the available resources allow. The ordering of the execution of the steps may also be modified without departing from the spirit and scope of the disclosure.

Figure 25:
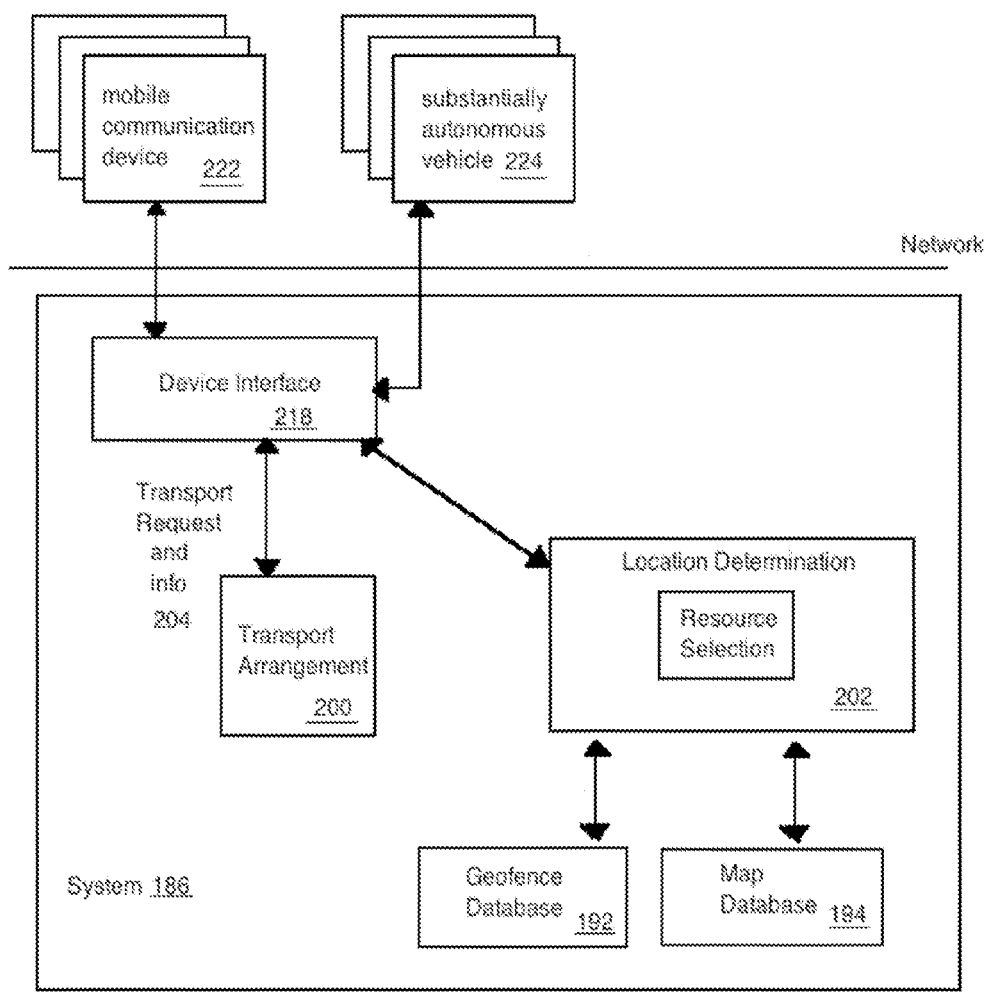
FIG. 25 shows an example embodiment processing and dispatch system of the intermediate aspect in accordance with aspects of the present disclosure.

The system of FIG. 25 corresponds to an example processing and dispatch system 186 (i.e. the intermediate aspect) that selects a substantially autonomous vehicle for the purpose of a transport service for the user. The intermediate aspect 186 can receive a location identifying data point from a mobile communications device of a user and perform the relevant geographical location processes to determine an address or other location information corresponding to the location identifying data point. Such geographical location processes may be performed also if the user provides a physical locational address or a name of a person. Accordingly, the intermediate aspect 186 comprises a location determination 202, a transport arrangement 200, a device interface 218, a geofence database 192, a map database 194, a plurality of connected mobile communications devices 222 and a plurality of connected substantially autonomous vehicles 224. The mobile communications devices 222 and the substantially autonomous vehicles 224 may be connected via a wireless communications network, such as IEEE 802.11x, WiMAX, Zigbee, cellular network, satellite networks, combinations thereof, and the like. Logic can be implemented with various applications, e.g., software, and/or with hardware of a computer system that implements the intermediate aspect 186. One or more of components of the intermediate aspect 186 can be implemented on servers, implemented through other computer systems in alternative architectures (e.g. peer-to-peer networks, etc.). Additionally, or alternatively, one or more of the components of the intermediate aspect 186 can be implemented on mobile communications devices 222, such as through applications that are executed on the mobile communications devices 222 and/or implemented on one or more substantially autonomous vehicles 224, such as through applications that are executed by the controller(s) of the one or more substantially autonomous vehicles 224. The intermediate aspect 186 can communicate, over one or more networks, with mobile communications devices 222 and/or substantially autonomous vehicles 224 using the device interface 218. In some instances, the location determination 202 can receive a geographical location data point from a mobile communications device 222 via the device interface 218. For example, the user of the mobile communications device 222 can select or specify a particular location (which may optionally include a name of a person) pertaining to the on-demand and/or location-based service for a substantially autonomous vehicle taxi-service. The user can interact with a map interface, for example, which shows the user's current location (e.g., the current location of the mobile communications device 222) as well as one or more graphic features (e.g., a location marker) that can be moved on the map by the user to indicate a location for use with requesting a location-based service. In one example, the location specified by the location marker on the map can be a taxi-start location parameter and/or a destination location parameter for a transport service, or a drop-off location for a delivery service, etc., facilitated by a substantially autonomous vehicle. In some instances, the location data point corresponding to the selected location includes a latitude and/or a longitude. For example, the mobile communications device 222 can include a global positioning system (GPS) component and/or other components that can determine the GPS coordinates for the current location of the mobile communications device 222 or the selected location on the map interface—e.g., the second taxi-start location parameter. The location determination 202 can access or communicate with various modules to determine location information or an address for a received location data point. The various modules can include the geofence database 192, the map database 194, and/or a plurality of other databases, such as a database for storing text strings or images, including motion-based media (not shown). The geofence database 192 can be created for a particular geographical region and the like. The map database 194 can relate to mapping information stored with the intermediate aspect 186. For example, the mapping information can be provided by or retrieved from mapping sources, such as OpenStreetMap (OSM), an open source mapping database, or from other mapping sources either open-sourced, or where applicable, closed-source. The map database 194 can be periodically updated using information from OSM and/or can be updated by an administrator of the intermediate aspect 186. If the map database 194 is inaccessible or unavailable or if no corresponding address or location information is found in the map database 194, the location determination 202 can identify a custom text string that is stored in the text string database. The location determination 202 can cause the custom text string, such as, but not limited to, "Address is unavailable," "Select another location," or "Input an address in the text field," (inclusive of a name of a person) to be transmitted to the mobile communications device 222. In this manner, the user can receive accurate information regarding an address or location for an on-demand location-based substantially autonomous vehicle service before making a request for the substantially autonomous vehicle. The intermediate aspect 186 can include the transport arrangement 200 that receives a transport request 204 from a mobile communications device 222. A user of the mobile communications device 222 can select a location, such as a taxi-start location parameter, one or more times within various parameters and limitations as described in this disclosure. The user can then make a transport request 204 via the first set of processor readable programmatic instructions operating on the mobile communications device 222 to the intermediate aspect 186 using the selected taxi-start location parameter (or select a different location therein). The transport request 204 can include locational parameters (specifically, a second taxi-start location parameter) and the transport arrangement 200 can arrange for transport to be provided by an appropriate substantially autonomous vehicle based on the second taxi-start locational parameter, which specifies the taxi-start location. For example, in a certain geographical area there can be a plurality of substantially autonomous vehicles 224. The transport arrangement 200 can process a substantially autonomous vehicle transport request 204, e.g., what type of vehicle is requested, time-parameters, etc. and/or the second taxi-start location parameter. When the transport arrangement 200 selects a substantially autonomous vehicle, information about the transport service can be provided to the mobile communications device 222 and the controller of the substantially autonomous vehicle 224 (e.g., to the service applications—e.g. the second set of processor readable programmatic instructions—operating on the mobile communications device 222 and the service applications running on the substantially autonomous vehicle 224). The controller of the substantially autonomous vehicle is also notified of the taxi-start pickup location selected by the user. Instead of providing a location data point of the second taxi-start location parameter selected by the user of the mobile communications device 222 to the controller of the substantially autonomous vehicle 224, however, in some examples, the location determination 202 can provide the corresponding street address or location, or name of a person, to the controller of the substantially autonomous vehicle 224 as address, name, or location information.

Figure 26:
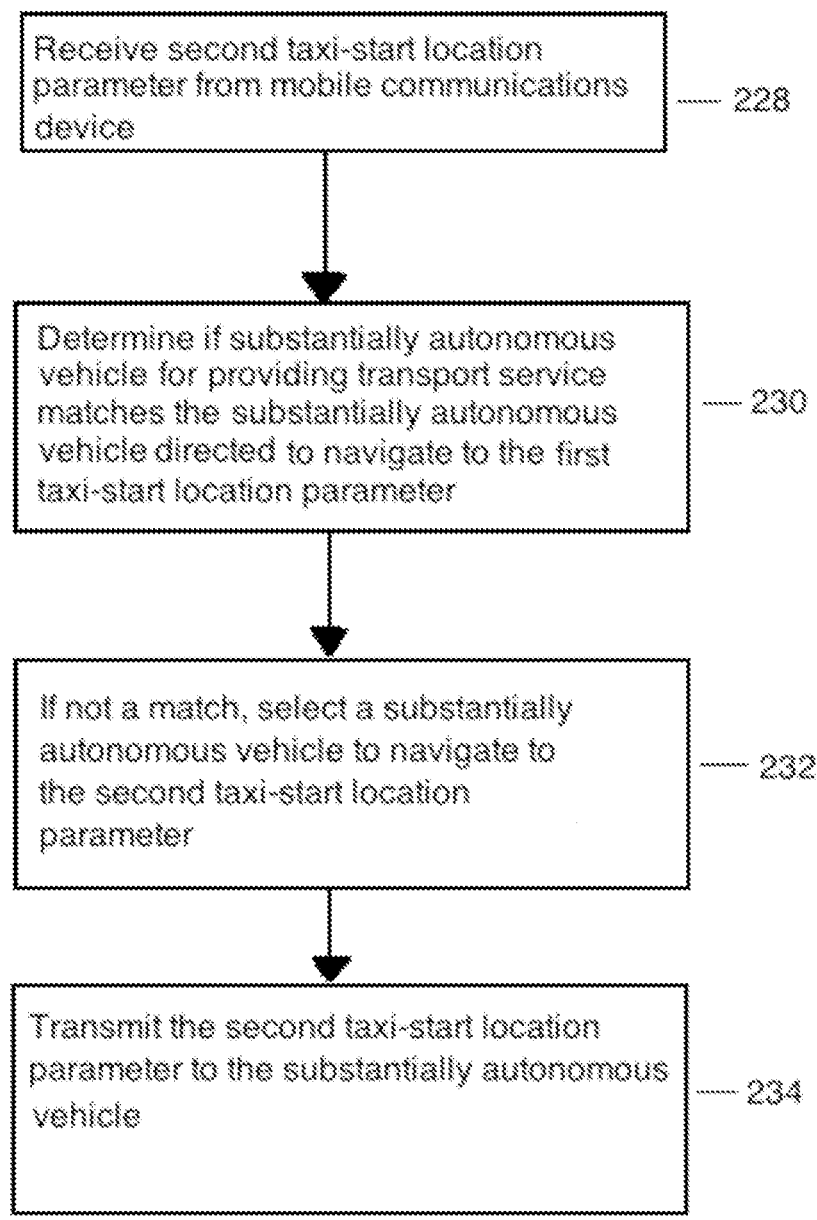
FIG. 26 shows an example embodiment process method for determining a suitable substantially autonomous vehicle to navigate to the second taxi-start location parameter performed by the intermediate aspect.

Turning now to FIG. 26, a process method for determining a suitable substantially autonomous vehicle to navigate to the second taxi-start location parameter performed by the intermediate aspect 186 is illustrated. At a step 228, the intermediate aspect 186 receives a second taxi-start location parameter from the mobile communications device. The second taxi-start location parameter may be a location data point, a physical address, a latitude and/or longitude, an identifying code, a name of a person, and the like. The received second taxi-start location parameter may be converted into a format readable by the intermediate aspect 186 and/or other geolocational data may be retrieved in order to determine an accurate second taxi-start location parameter readable by, for example, a controller of a substantially autonomous vehicle. At a step 230, a determination is made as to whether the substantially autonomous vehicle dispatched to navigate to the first taxi-start location parameter is suitable or appropriate, considering resources available and/or costs, to navigate to the second taxi-start locational parameter. Such determination may include: (1) calculation of relative distance between the first taxi-start location parameter and the second taxi-start location parameter and correlating the relative distance to the resources available in terms of proximity of the substantially autonomous vehicle selected for the first taxi-start location parameter to the selected or inputted second taxi-start location parameter and comparing that proximity to the relative distance of the closest available other substantially autonomous vehicle to the second taxi-start location parameter; (2) calculation of relative schedules and other user requests on the transport network utilizing algorithms to determine the most efficient usage of resources, taking into account user preferences previously selected or inputted via the first set of processor readable programmatic instructions or a set of processor readable programmatic instructions associated with the first set of processor readable programmatic instructions, user preferences including, for example, the request for a luxury model substantially autonomous vehicle, and the like. If the result of the determination is a match between the substantially autonomous vehicle previously dispatched to navigate to the first taxi-start location parameter and the substantially autonomous vehicle dispatched to navigate to the second taxi-start location parameter, the process method may terminate. It should be noted that in some cases the change in the taxi-start location parameter may occur before a first substantially autonomous vehicle has been selected to complete the service request. In that case—e.g. wherein the selection of the second taxi-start location parameter occurs between 6 and 21 seconds—the execution of this process method may not be necessary. In the case that the step 230 does not return a match, at a step 232, the process method selects a suitable substantially autonomous vehicle to navigate to the second taxi-start location parameter. This selection may be based on a combination of the calculations and determinations performed in the step 230 and user preferences previously inputted via the first set of processor readable programmatic instructions or a set of processor readable programmatic instructions associated with the first set of processor readable programmatic instructions. For example, in addition to the calculations and determinations related to resources allocations performed at the step 230, user preferences for a luxury model substantially autonomous vehicle, or a substantially autonomous vehicle with certain design features, such as seat color, and the like, may be taken into account. The conclusion of the step 232 is the selection of a suitable substantially autonomous vehicle to navigate to the user-inputted second taxi-start location parameter. At a step 234, the intermediate aspect 186 via the process method directs the transmission, for example via a preferably secure wireless communications channel, of an at least one modulated electromagnetic signal comprising a data packet comprising the second taxi-start location parameter to the controller of the pre-determined substantially autonomous vehicle. The data packet, if required, is converted into a format readable by the controller of the substantially autonomous vehicle prior to being transmitted or this conversion may be performed by one or more programmatic processes upon reception of the data packet at the substantially autonomous vehicle.

Figure 27:
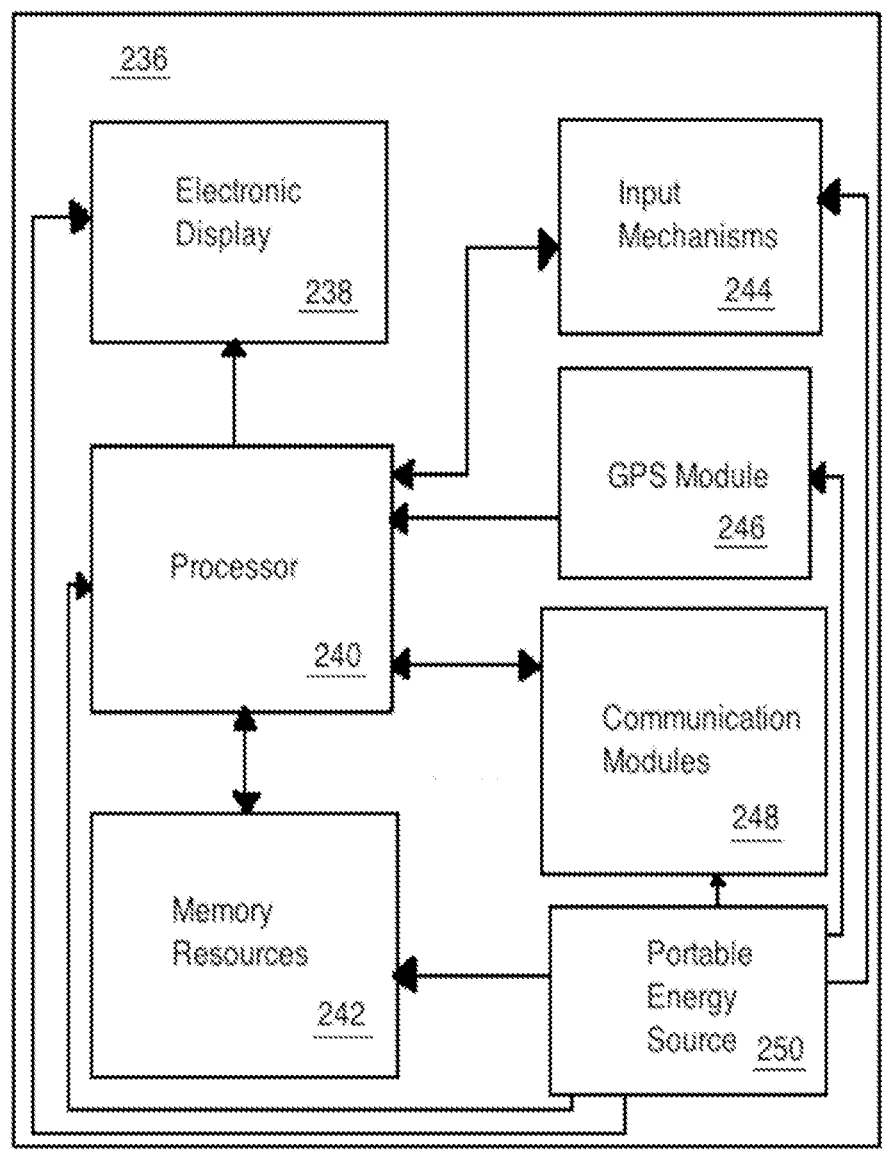
FIG. 27 shows an example embodiment mobile communications device in accordance with the present disclosure.

FIG. 27 illustrates the various system components of an example mobile communications device 236 operable to execute the first set of processor readable programmatic instructions and the second set of processor readable programmatic instructions and the preferred and alternative embodiments described in the present disclosure. It should be noted that one or more of the specified modules or components may, in some instances, be removed without affecting the spirit and scope of the present disclosure. The mobile communications device 236 is comprised of an electronics display 238, a processor 240, a memory module 242, an input mechanism 244, a GPS module 246, a communications module 248, and a portable energy source 250. The processor 240 is operable to process at least aspects of the first set of processor readable programmatic instructions and at least aspects of the second set of processor readable programmatic instructions substantially simultaneously, or substantially in parallel. The processor 240 is connected or coupled to, respectively, the electronics display 238, the memory module 242, the input mechanism 244, the GPS module 246, the communications module 248, and the portable energy source 250. The processor may be one or more suitable hardware and/or software components operable to perform the normative functions of a processor device as known by those with ordinary skill in the art. Alternatively, a substantive portion of the processing functionality of processor 240 may be stored on a third party computer system or electronics device, accessible via the communications modules 248. The processor may be one or more microprocessors, microcontrollers, controllers, microchips, CPUs, and the like. The memory module 242 comprises a storage medium adapted to store, temporarily or permanently, the first set of processor readable programmatic instructions and the second set of processor readable programmatic instructions and to send at least aspects of the first set of processor readable programmatic instructions and the second set of processor readable programmatic instructions to the processor 240 as required. The electronics display 238 is adapted to generate a plurality of user-perceptible output electrical signals comprising user-output based upon processing by the processor 240. In keeping with the spirit and aims of the present disclosure, at an instance in time when a plurality of output electrical signals displayed on electronics display 238 comprises output from the first set of processor readable programmatic instructions, output generated from the second set of processor readable programmatic instructions should be significantly limited, as described in embodiments of the present disclosure. The electronics display may be any suitable touch screen, LCD display, 3D display, virtual reality display, augmented reality display, holographic display, a plurality of light signals projected and/or suspended in 3D space, and the like, as those with ordinary skill in the art will readily understand. The GPS module 246 is operable to retrieve geolocational coordinates and other locational data about the present geographical positioning of the mobile communications device 236. Geolocational coordinates may be obtained from the Internet, a third party server, or via triangulation via one or more of the GPS orbital satellites. Data retrieved from the GPS module 246 is operable to be processed by processor 240, stored in memory module 242, and otherwise utilized to assist in determining the second taxi-start locational parameter in accordance with embodiments of the present disclosure. The input mechanism 244 may be any touch screen, keyboard, peripheral computer device, a clicker, a motion sensor, an microphone or other audio input device, an infrared sensor, a light sensor, an environmental sensor of any type, combinations thereof, and the like. Electrical signals generated at the input mechanism are sent to the processor 240 for processing. Input mechanisms 244 are adapted to facilitate user-input of the second taxi-start location parameter. The communications modules 248 may comprise suitable wireless communications modules and/or wired communications modules. Examples include: Ethernet, cellular network access and communications, WiMAX, IEEE 802.11x, Bluetooth, ZigBee, infrared, and derivatives, combinations, and substitutes of these thereof. The communications module receives and/or transmits signals from/to the processor 240. Specifically, the communications modules 248 are operable to facilitate communications with a controller of: a substantially autonomous vehicle, the intermediate aspect, third party computers, and the like, specifically with regards to facilitating the communication of the second taxi-start location parameter. The portable energy source 250 provides electrical energy to, respectively, each of the electronics display 238, the processor 240, the memory module 242, the input mechanisms 244, the GPS module 246, and the communications modules 248. In the instance the processor 240, is processing the first set of processor readable programmatic instructions to determine the second taxi-start locational parameter, the portable energy source 250 should have at least 15 percent or more electrical energy remaining to discharge at a future point in time to any one or more of the components of the mobile communications device 236, but preferably more than 20 percent, and even more preferable more than 26 percent. The portable energy source 250 may be any suitable battery device known in the art. In some instances, it may be applicable for the mobile communications device 236 to comprise more than one of some components, or each component.

Figure 28:
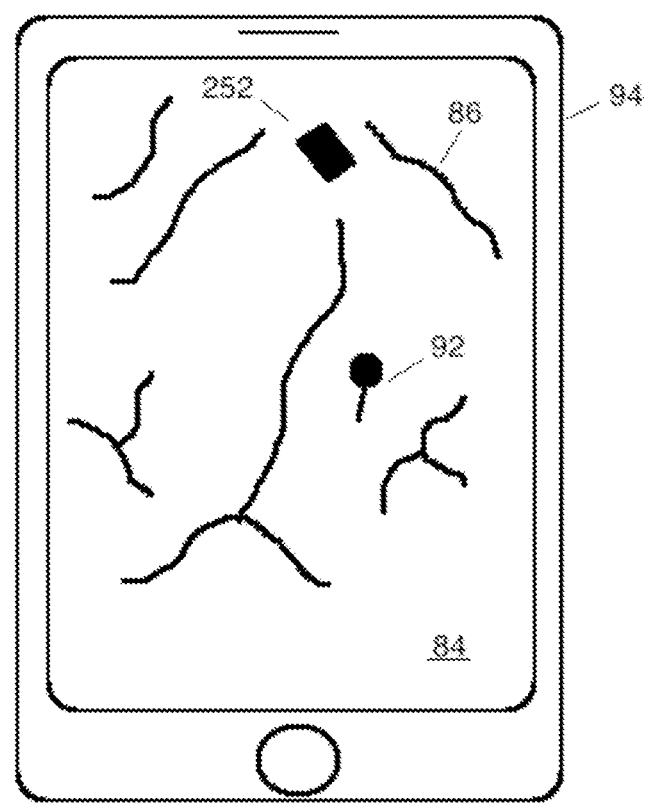
FIG. 28 shows a map display embodiment depicting a GPS tracking of a substantially autonomous vehicle navigating to the second taxi-start location parameter at an instance in time, in accordance with aspects of the present disclosure.

FIG. 28 illustrates an example embodiment of 84 with terrain 86, second taxi-start location parameter geolocational marker 92 encapsulated within the dimensional confines of example mobile communications device 94. In this example embodiment, a geolocational positional marker 252 illustrates the relative location at a particular point in time of the substantially autonomous vehicle operable to navigate to the second taxi-start location parameter. The intermediate aspect 186 and/or the substantially autonomous vehicle transmits electromagnetic signal to mobile communications device 94 comprising GPS-based data of the current, or near-current, position of the substantially autonomous vehicle. This data is transformed into an electrical signal adapted to be outputted at the user-interface device, and in this example embodiment, outputted as a geolocational image-based marker. However, 252 could, in alternative embodiments, be represented as a 3D marker, a series of light-pulses, an audio output, a motion-image, and the like. The process of retrieving the current geolocational position of the substantially autonomous vehicle at any point in time is expected to reiterate a plurality of times until at least the substantially autonomous vehicle reaches the second taxi-start location parameter, or a pre-determined vicinity, thereof.

Figure 29:
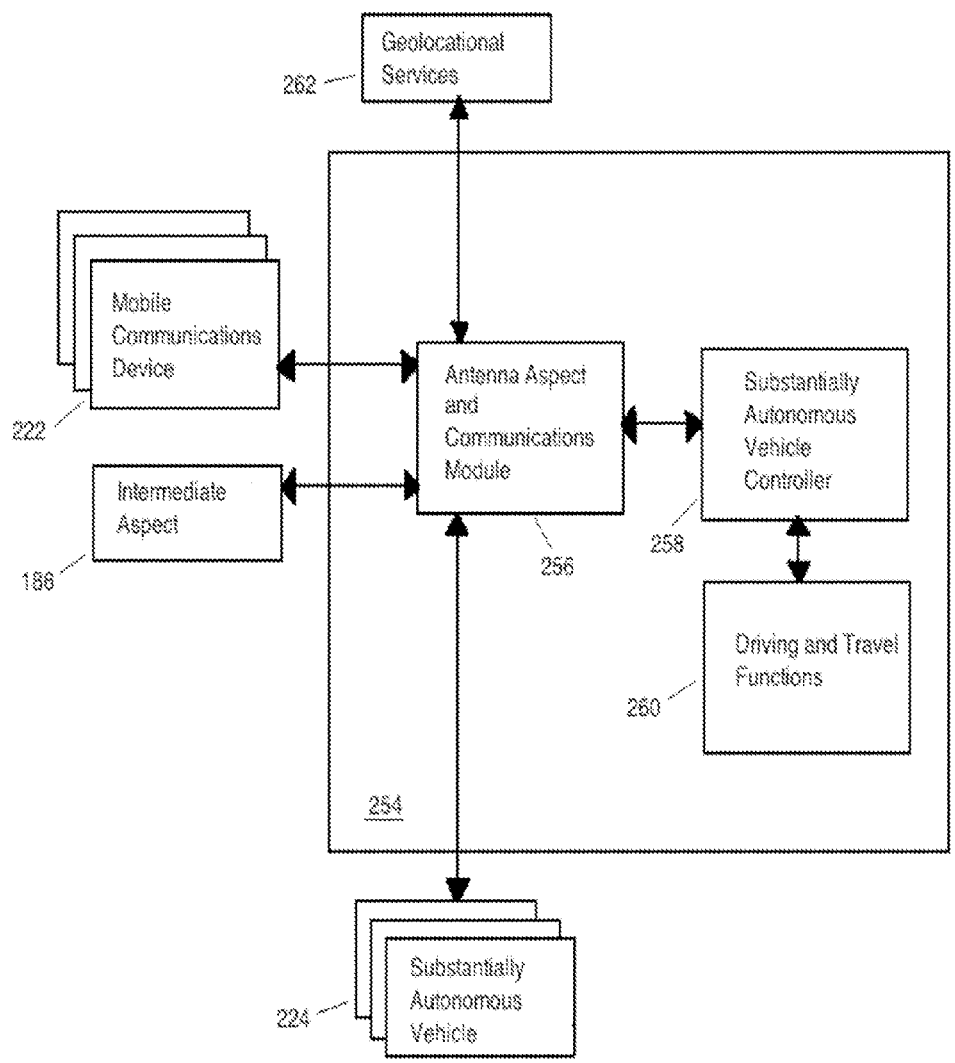
FIG. 29 shows a block diagram of aspects of a substantially autonomous vehicle in accordance with the present disclosure.

FIG. 29 illustrates an example block diagram of the internal logic and essential system components of a substantially autonomous vehicle of the present disclosure. An example substantially autonomous vehicle 254 operable to navigate to the second taxi-start location parameter is illustrated. The substantially autonomous vehicle comprises a controller 258 operable to execute and process a plurality of processor readable programmatic instructions. Controller 258 is in electrical communication with driving and travel functions 260 which one with ordinary skill in the art would readily recognize (e.g. braking, sensor-based travel and navigation, and the like) and will hence not be further discussed here. Controller 258 is in electrical communication with an antenna aspect and communications module operable to receive data from the controller 258 and transform that data into a plurality of modulated electromagnetic signals and transmit the plurality of modulated electromagnetic signals to one or more of plurality of distance separated entities, such as one or more mobile communications devices 222, the intermediate aspect 186, one or more other substantially autonomous vehicles 224, and further operable to receive data from one or more of the plurality of distance separated entities, such as one or more mobile communications devices 222, the intermediate aspect 186, one or more other substantially autonomous vehicles 224, and geolocational services 262 and subsequently transform that data into a series of demodulated electrical signals operable to be read and processed by controller 258.

Figure 30:
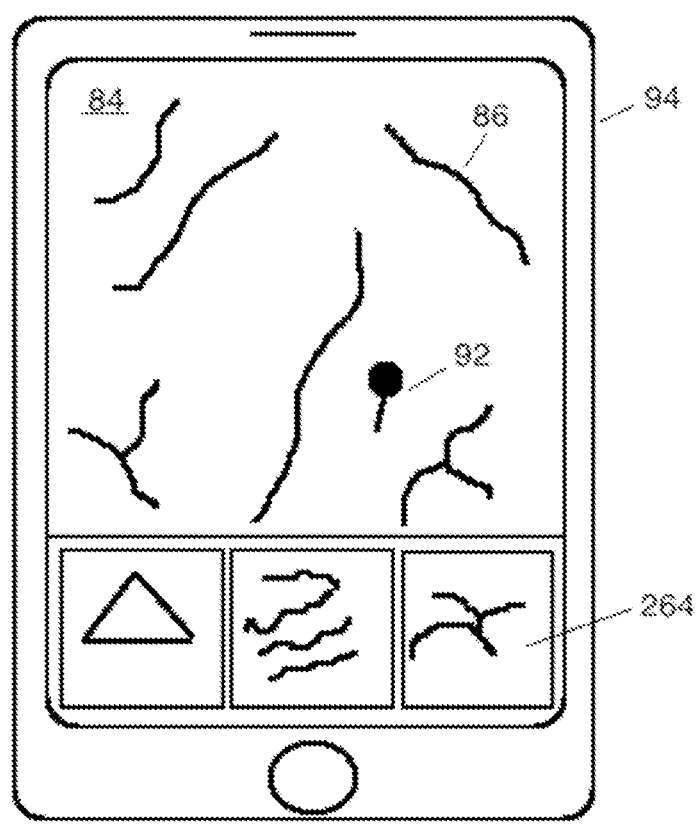
FIG. 30 shows an electronics display on a mobile communications device wherein an aspect of the second set of processor readable programmatic instructions depicting a social media network is simultaneously displayed with the first set of processor readable programmatic instructions depicting an aspect of the registering and processing of the second taxi-start location parameter.

FIG. 30 illustrates 84 in an example embodiment within the confines of 94, wherein an aspect 264 of the second set of processor readable programmatic instructions is simultaneously displayed via the electronics display with the first set of processor readable programmatic instructions (e.g. 92). In this example embodiment, 264 comprises a series of picture based news items retrieved from a social network provider, wherein 264 is dimensionally limited to within the area confines of a maximum of seven a quarter eighths of the user-interactive electronics display and further a minimum of a twentieth of a first eighth of the user-interactive electronics display. The electronics display may also be a virtual reality display, an augmented reality display, a holographic display, a 3D display, a plurality of light signals occupying an area of 3D space, and the like.

In the preferred and alternative embodiments presented in FIGS. 1 to 11, in some instances, the confirmation data packet steps 44, 46, and 48 may all be removed, or at least one step removed, without affecting the spirit and scope of the aims of the embodiments. In one or more of the embodiments of the present disclosure, steps may be removed or substituted or rearranged without affecting the spirit and scope of the present disclosure. The embodiments presented are representative, but not intended to be limiting. In one or more embodiments of the present disclosure, the process methods operable to facilitate the selection of the second taxi-start location parameter may be applicable to a plurality of substantially autonomous vehicles, such as a fleet of substantially autonomous vehicles.

In the preferred and alternative embodiments presented in FIGS. 1 to 11, user input may, in some instances, simply comprise an input of a text-based character string.

In the preferred embodiments, alternative embodiments, and aspects of the present disclosure, the social media networks may include image based networks, image and text based networks, music based networks, motion-image based networks, text based networks, commercial product(s) and/or service(s) based networks, recreational media based networks, calendar, task, and project management based networks, some combinations and/or integrations of the aforementioned types, and the like.

In the various preferred embodiments, alternative embodiments, and aspects of the present disclosure, the limitations of the second set of processor readable programmatic instructions in terms of generating and sending a plurality of electrical signals to the user-interface device to be outputted as a user-perceptible display simultaneous with or substantially simultaneous with or in parallel with the first set of processor readable programmatic instructions (i.e. to not be outputted by the user-interface device at the same time as the user-interface device is outputting data from the first set of processor readable programmatic instructions or to only be outputted wherein the output signals generated by the second set of processor readable programmatic instructions occupies no more than seven and a quarter eighths of the total user-interactive area of an electronics display screen comprising the user-interface device and a minimum of a twentieth of a first eighth of the user-interactive area of the electronics display screen, and wherein if the limited output signals generated by the second set of processor readable programmatic instructions are audio, such audio output signals are extant, in sum, for preferably no more than 27 seconds, and less preferably up to a maximum of 5572.2 seconds) applies during the execution of the aspect (i.e. first portion of the first pre-determined period of time) of the first set of processor readable programmatic instructions wherein a second taxi-start location parameter is being registered and processed. The first portion of the first pre-determined period of time wherein a second taxi-start location parameter is being registered and processed is further defined with a time-duration of preferably greater than 20 seconds, less preferably greater than 120 seconds, and further less preferably greater than 422 seconds and wherein the registration and processing of the second taxi-start location parameter is extant until the substantially autonomous vehicle operable to navigate to the second taxi-start location parameter is within preferably 9.8 meters, less preferably 12.5 meters, and further less preferably 25.4 meters of a second location wherein the mobile communications device of the present disclosure is positioned in 3D space, wherein the second location is separated and distant from a first location and wherein the first location is the position in 3D space where the user of the mobile communications device of the present disclosure inputted the first user-input consisting of the second taxi-start location parameter. This is critical to assist in user-distraction reduction to a minimal required level by the user and to ensure an effective service. To further assist in reducing user-distraction, the portable energy source preferably remains above 15 percent until at least the substantially autonomous vehicle operable to navigate to the second taxi-start location parameter is within 25.4 meters of the second location. The first location and the second location, respectively, are determined via GPS coordinates, or an appropriate substitute or alternative system or process for determining or measuring a positional location in 3D space.

In the preferred and alternative embodiments of the present disclosure, in some instances it may be desirable for the second set of processor readable programmatic instructions to further include: terminating an authenticated connection with the social network provider hosted on the third-party server for at least a period of time not exceeding 5581 seconds and occurring at a point in time simultaneous with the registration and processing of the first user-input comprising the second taxi-start location parameter, or occurring at a point in time simultaneous with the registering and processing of the second taxi-start location parameter by the first set of processor readable programmatic instructions; this termination may be in connection or conjunction with a third set of, processor readable programmatic instructions, such as an automated algorithmic process, artificial intelligence process, and the like.

The applications of the one or more embodiments of the present disclosure are to substantially autonomous vehicle on-demand taxi-services for people, animals, goods, services, combinations, and the like; to substantially autonomous vehicle taxi-services wherein the substantially autonomous vehicle is an asset of the requesting user, and the like. The applications of the one or more embodiments of the present disclosure are relevant for metropolitan and urban areas, and for transport services of any duration. The advantage of the one or more embodiments of the present disclosure is to reduce distraction whilst the selection or inputting of the second taxi-start location parameter for a substantially autonomous vehicle to navigate to is user-inputted and processed. Assisting non-distraction by limiting access to a social network environment in the instance that a second taxi-start location parameter is user-inputted, registered and processed will assist in providing an experience of a substantially autonomous vehicle transport service that is desirable to be repeated.

The various illustrative logical blocks, modules, and circuits described in connection with the embodiments disclosed herein may be controlled with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The control steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the control functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While every effort has been made to adequately describe the embodiments to which the present disclosure can be applied, those skilled in the art will appreciate that further embodiments may exist to which the present disclosure can be applied congruently and without departing from the spirit of this disclosure.

While the present disclosure has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the disclosure in its broader aspects is not limited to the specific details, representative apparatus and methods, and illustrative examples shown and described. Accordingly, departures may be made from such details without departure from the spirit or scope of the Applicant's general inventive concept.

The invention claimed is:

1. A communications device operable to enable a user to re-select or re-determine a taxi-start location parameter for a substantially autonomous vehicle to navigate to, the communications device comprising:
   a user-interface device operable to listen for a first user-input;
   a first processor coupled to the user-interface device;
   a non-transient computer-readable storage medium operable to store a plurality of processor-readable programmatic instructions, wherein the plurality of processor-readable programmatic instructions comprises a first set of processor-readable programmatic instructions and a second set of processor-readable programmatic instructions; and
   the first processor facilitated execution of the first set of processor-readable programmatic instructions includes: registering the first user-input generated at the user-inter-face device, wherein the first user-input signal comprises a second taxi-start location parameter for a substantially autonomous vehicle to navigate to, and wherein the registering and processing of the first user-input comprising the second taxi-start location parameter occurs at a first portion of time between 6 seconds and 5581.2 seconds after the inputting of a first taxi-start location parameter; and
   wherein a data packet is generated comprising a second taxi-start location parameter data and transforming the data packet into a modulated electromagnetic signal and wherein the second taxi-start location parameter data is operable to be received and processed by a second processor coupled to an intermediate aspect, or received and processed by a third processor coupled to a substantially autonomous vehicle.

2. The device of claim 1 further comprising:
   the first processor facilitated execution of the second set of processor-readable programmatic instructions includes: maintaining a secure authentication via a communications network to a third-party server and retrieving from the third-party server an assigned plurality of generated news items, an assigned plurality of active links, an assigned limitation of the number of viewers, and an assigned ordering of the generated news items; and
   wherein the first processor facilitated execution of the first set of processor-readable programmatic instructions and the first processor facilitated execution of the second set of processor-readable programmatic instructions occurs one of simultaneous with the registering and processing of the first user-input, substantially simultaneous with the registering and processing of the first user-input, or at an instance of time or a period of time after the registering and processing of the first user-input.

3. The device of claim 2, further comprising:
   the first processor facilitated execution of the first set of processor-readable programmatic instructions further includes: causing a first plurality of electrical signals to be generated and converted into a format required by the user-interface device at the user-interface device at a first instance of time or a first period of time; and
   the second processor facilitated execution of the second set of processor-readable programmatic instructions further includes: causing a second plurality of electrical signals to be generated and converted into a format required by the user-interface device at the user-inter-face device at a second instance of time or a second period of time that is at least subsequent to the first instance of time or at least subsequent to the first period of time.

4. The device of claim 2, further comprising:
   the first processor facilitated execution of the first set of processor-readable programmatic instructions further includes: causing a first plurality of electrical signals to be generated and converted into a format required by the user-interface device at the user-interface device at a first instance of time or a first period of time; and
   the second processor facilitated execution of the second set of processor-readable programmatic instructions further includes: causing a second plurality of electrical signals to be generated and converted into a format required by the user-interface device at the user-interface device at the first instance of time or the first period of time.

5. The device of claim 2, further comprising:
the first processor facilitated execution of the first set of processor-readable programmatic instructions further includes: causing a first plurality of electrical signals to be generated and converted into a format required by the user-interface device at the user-interface device at a first instance of time or a first period of time; and
the second processor facilitated execution of the second set of processor-readable programmatic instructions further includes: causing a second plurality of electrical signals to be generated and converted into a format required by the user-interface device at the user-interface device at a second instance of time or a second period of time that at least partially overlaps with the first instance of time or that at least partially overlaps with the first period of time.

6. The device of claim 4, wherein the converted second plurality of electrical signals are operable to be displayed via an electronics display comprising the user-interface device wherein a display of the converted second plurality of electrical signals is limited to no greater than a maximum of seven-and-a-quarter eighths of a user-interface area of the electronics display and further limited to less than a minimum of a twentieth-of-a-first-eighth of the user-interactive area.

7. The device of claim 5, wherein the converted second plurality of electrical signals are operable to be displayed via an electronics display comprising the user-interface device wherein a display of the converted second plurality of electrical signals is limited to no greater than a maximum of seven-and-a-quarter eighths of a user-interface area of the electronics display and further limited to no less than a minimum of a twentieth-of-a-first-eighth of the user-interactive area.

8. The device of claim 1, wherein the first processor facilitated execution of the first set of processor-readable programmatic instructions further includes: registering and processing at a period of time a GPS-based indication of a specific location of a substantially autonomous vehicle operable to navigate to the second taxi-start location parameter, wherein the GPS-based indication is received via an electromagnetic signal.

9. The device of claim 1, wherein the first processor facilitated execution of the first set of processor-readable programmatic instructions or the first processor facilitated execution of a third set of processor-readable programmatic instructions is operable to register that the available electrical energy stored in an energy source is at least 15 percent of a total electrical capacity of the energy source.

10. The device of claim 1, wherein the second taxi-start location parameter comprises one or more of a road name, a commercial building name, a residential building name, a latitude, a longitude, a GPS coordinate, a string of characters derived from an alphabet, a map coordinate, and a landmark name.

11. The device of claim 2, wherein the news items comprises one or more of a plurality of images, a plurality of motion-image videos, a plurality of audio signals, and a plurality of light-based displays.

12. The device of claim 1, wherein the first processor comprises a plurality of processors, of which at least one of the plurality of processors is located remote to the device and accessible via a communications module coupled to the device.

13. The device of claim 1, wherein the second taxi-start location parameter is separated from a previously inputted first taxi-start location parameter for a substantially autonomous vehicle to navigate to by a distance of between and inclusive of 12 meters and 4502 meters in any direction.

* * * * *